US005663631A

United States Patent [19]
Kajiura et al.

[11] Patent Number: 5,663,631
[45] Date of Patent: Sep. 2, 1997

[54] GENERATOR WITH CIRCUITRY FOR CONTROLLING POWER GENERATION BASED ON ROTATIONAL SPEED

[75] Inventors: Hiroaki Kajiura, Nagoya; Akira Mase, Handa, both of Japan

[73] Assignee: Nippondenso Co., Ltd., Kariya, Japan

[21] Appl. No.: 499,003

[22] Filed: Jul. 6, 1995

[30] Foreign Application Priority Data

Jul. 19, 1994 [JP] Japan .................................. 6-167236
Nov. 30, 1994 [JP] Japan .................................. 6-296116

[51] Int. Cl.$^6$ .................................................. H02P 9/44
[52] U.S. Cl. .................................................. 322/29; 322/59
[58] Field of Search .................................... 32/28, 20, 29, 32/32, 59

[56] References Cited

U.S. PATENT DOCUMENTS

| | | | |
|---|---|---|---|
| 4,710,686 | 12/1987 | Guzik | 318/293 |
| 4,948,997 | 8/1990 | Ohmitsu et al. | 310/113 |
| 5,177,677 | 1/1993 | Nakata et al. | 363/89 |
| 5,323,102 | 6/1994 | Torii et al. | 322/90 |
| 5,469,816 | 11/1995 | Murakawa et al. | 123/2 |
| 5,495,162 | 2/1996 | Rozman et al. | 322/10 |

FOREIGN PATENT DOCUMENTS

| | | |
|---|---|---|
| 357183 | 3/1990 | European Pat. Off. . |
| 464694 | 3/1993 | European Pat. Off. . |
| 0582470 | 2/1994 | European Pat. Off. . |
| 4007350 | 9/1990 | Germany . |
| 4-138030 | 5/1992 | Japan . |
| 92/14298 | 8/1992 | WIPO . |

OTHER PUBLICATIONS

Ammasaigouden N et al, "Microprocessor–Based Voltage Controller for Wind–Driven Induction Generators", 1 Dec. 1990, IEEE Transactions in Industrial Electronic, vol. 37, NR. 6 pp. 531–537.
Patent Abstract of Japan, vol. 016 No. 412 (E–1256) Aug. 1992 re JP-A 4138030.
Patent Abstract of Japan, vol. 17 No. 110 (E–1329) Mar. 1993 re JP-A-4295236.
Patent Abstract of Japan, vol. 18 No. 088 (E–1507) Feb. 1994 re JP-A 4292799.

*Primary Examiner*—Steven L. Stephan
*Assistant Examiner*—Nicholas Ponomarenko
*Attorney, Agent, or Firm*—Cushman, Darby & Cushman IP Group of Pillsbury Madison & Sutro LLP

[57] ABSTRACT

A full-wave-rectifying-circuit is composed of six diodes and six transistors inversely connected in parallel with the diodes. A phase-control-circuit has three magnetic sensors each of which corresponds to one of the phase-windings and positioned so as to lag by an electric angle of 90° to provide digital signals which lag an electric at an angle of 60° behind the induced-phase-signal. The six transistors are driven by the digital signals to form controlled AC voltages which lag behind the induced line voltages by an electric angle 60° so that the alternator increases the output power without increase of the body size.

44 Claims, 23 Drawing Sheets

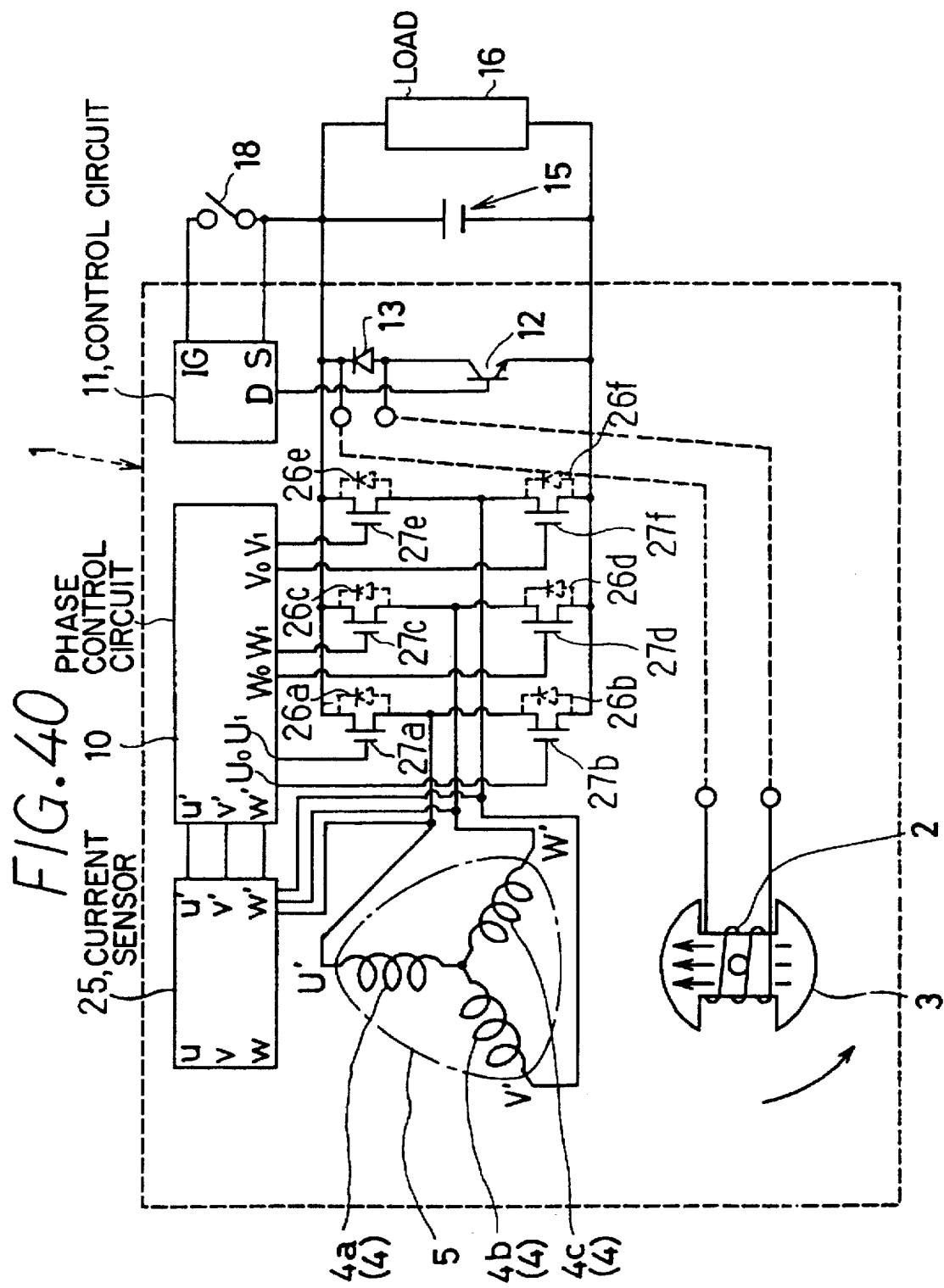

GENERATOR WITH CIRCUITRY FOR CONTROLLING POWER GENERATION BASED ON ROTATIONAL SPEED

CROSS REFERENCE TO RELATED APPLICATION

The present application is based on and claims priority from Japanese Patent Applications Hei 6-167236 and Hei 6-296116 respectively filed on Jul. 19, 1994 and Nov. 30, 1994, the contents of which are incorporated herein by reference.

BACKGROUND OF THE INVENTION

1. Field of the Invention

The present invention relates to an AC generator having a full-wave-rectifying-circuit and particularly relates to an alternator for charging a battery installed in a vehicle or the like and a generator or a motor-generator for an electric vehicle.

2. Description of Related Art

An alternator exemplified in FIG. 32 is equipped with a rotor 110 which has a field coil 100 and a stator (not shown) which has a three-phase-armature coil 120. When the rotor (magnetic field) 110 rotates with the field coil 100 being excited by an exciting circuit 130, respective phase-voltages are induced in the respective phase-windings 120a, 120b and 120c. These voltages are converted (rectified) by a full-wave-rectifying-circuit having six-diodes 140 into a DC-current, which is supplied to a battery 150 and an electric load 160.

The alternator is required to generate more electric power (especially, power during a low speed range of an engine) since the electric load of the vehicle is increasing. Measures to increase the generating power are as follows: (1) increasing the alternator-size, (2) increasing the field current and (3) selecting a number of turns of the armature coil according to the rotational speed of the alternator.

Since the space of the engine compartment has been narrowed recently, a decrease in alternator size as well as an increase in output power has been required.

Although one of above measures —(1) increasing the alternator size-increases the output power over the entire speed range from low speed to high speed as shown in FIG. 33, it does not comply with the downsizing requirement. Although the second measure—(2) increasing the field current-increases the output power in the high speed range as shown in FIG. 34, it does not increase the output power in the low speed range. Although the third measure—(3) selecting the number of turns of the armature coil according to the rotational speed of the alternator-increases the output power in a high speed range when the number of turns of the armature coil is decreased as shown in FIG. 35, it decreases the output power in the low speed range. On the other hand, in order to increase the output power in the low speed range, if the number of armature-coil-turns is increased, the body-size will increase and the output in the high speed range will decrease as shown in FIG. 35.

Thus, it is rather difficult for the conventional alternator to increase the output power, particularly in the low rotational speed range, without increasing the body-size. Therefore, an entirely new idea is necessary for that purpose.

FIG. 36 is a circuit diagram of a single phase model illustrating the principle of the electric power generation.

The single phase model is composed of an armature resistance $r_a$, an armature inductance L, a load resistance R, and an AC power source (induced-phase-voltage $E_0$). Accordingly, a voltage V across the resistance R lags behind the induced-phase-voltage $E_0$ by a phase-angle difference $\delta$ as shown in FIG. 37 and FIG. 38.

The phase-angle difference $\delta$ is necessarily fixed by the circuit constants R, $R_a$ and $\omega L$ as is given by the following equation.

$$\delta = \tan^{-1}\{\omega L/(R+r_a)\}, \quad [E1]$$

wherein $\omega$: electric-angular-velocity $[\omega = (p/2)\times(n/60)\times 2\pi]$ p: the number of poles n: rotational speed (rpm)

On the other hand, a phase-current flowing through the resistance R is given by the following equation.

$$I = (E_0 - V\cos\delta)/Z_s, \quad [E2]$$

$Z_s$: synchronous impedance $[Z_s = \sqrt{\{(\omega L)^2 + r_a^2\}}]$

Since the frequency is low during the low speed range, the electric-angular-velocity $\omega$, and, consequently, $\omega L$ become small, and thus the phase angle difference $\delta$ becomes small according to the equation [E1]. That is, the phase lag of the voltage V relative to the induced-phase-voltage $E_0$ becomes smaller as the rotational speed becomes lower.

As the rotational speed becomes lower, in other words, the phase angle difference $\delta$ becomes smaller, $\cos\delta$ in the equation [E2] becomes greater, and accordingly, the phase current I, which flows through the load resistance R, becomes smaller and the output power P becomes smaller as shown in FIG. 39.

From the above study, if the phase angle difference $\delta$ between $E_0$ and V is increased during the low speed range, the current I will increase so that the total output current increases and, consequently, the output power of the alternator will increase.

Accordingly, if an AC-voltage which lags behind the induced-line-voltage (or induced-phase-voltage $E_0$) by a certain phase angle is applied across an adjacent couple of phase-windings to compose a phase-voltage which lags behind the induced-line-voltage (or induced-phase-voltage $E_0$), the phase angle difference $\delta$ between $E_0$ and V will increase.

SUMMARY OF THE INVENTION

The present invention is made with a view to the above consideration and findings, and an object thereof is to provide a new AC-generator control system.

Another object of the present invention is to provide an AC generator which increases the generating power particularly during the low rotational speed range without increasing the body size.

Another object of the present invention is to provide an AC generator which includes a switching unit having at least n-switch elements connected to the generator phase-windings. The switch elements form a bridge-type full-wave-rectifying-circuit for supplying DC current to a battery and also supplies an AC voltage to the generator phase-windings to increase the phase difference $\delta$. The AC-current generated in the full-wave-rectifying-circuit changes the modes of the armature output voltage, thereby controlling the DC-output of the full-wave-rectifying-circuit.

Another object of the present invention is to provide an AC generator which, in addition to the above structure, includes a position sensor for detecting the phase-difference between the generator magnetic-field-flux and the induced-phase-voltage and a driving circuit for driving the switch elements according to the detected phase-difference.

A further object of the present invention is to provide an AC generator which, in addition to the above structure, includes a power-sensor for detecting output power of the generator, a speed sensor, and a lag-angle-setting-circuit for setting a suitable lag angle of the AC voltage to be supplied to the phase windings according to the information from the power sensor and the speed sensor. The lag-angle-setting-circuit may include a control map which stores the lag angles which give a minimum loss in combination with a field current and a phase voltage. The generating power and the lag angle (which corresponds to the relative rotational speed between the magnetic field and the armature detected by the speed-sensor) are set according to the map. The switching elements are controlled to give the lag angle, thereby ensuring the power generation at the maximum efficiency.

A further object of the present invention is to provide an AC generator which, in addition to the above, a torque-sensor and a feedback circuit for setting a suitable lag angles according to information obtained by the torque-sensor. The feedback circuit sets the lag angle to give a minimum torque for generation, in other words, a maximum generation efficiency. Accordingly, the switching elements are controlled to give the lag angle, thereby ensuring the power generation at the maximum efficiency.

Since an embodiment of the present invention is available to reduce an output power, the output control is also possible in case of a constant field current. In addition, the output power can be increased regardless of the rotational speed as the case may be so that a compact alternator for its output power can be provided.

BRIEF DESCRIPTION OF THE DRAWINGS

Other objects, features, and characteristics of the present invention as well as the functions of related parts of the present invention will become clear from a study of the following detailed description, the appended claims and the drawings. In the drawings:

FIG. 40 is an overall circuit diagram of an alternator according to a sixth embodiment of the present invention.

DETAILED DESCRIPTION OF THE PREFERRED EMBODIMENT

A first embodiment of the present invention is described with reference to FIGS. 1 through 13 next.

Figure 1:
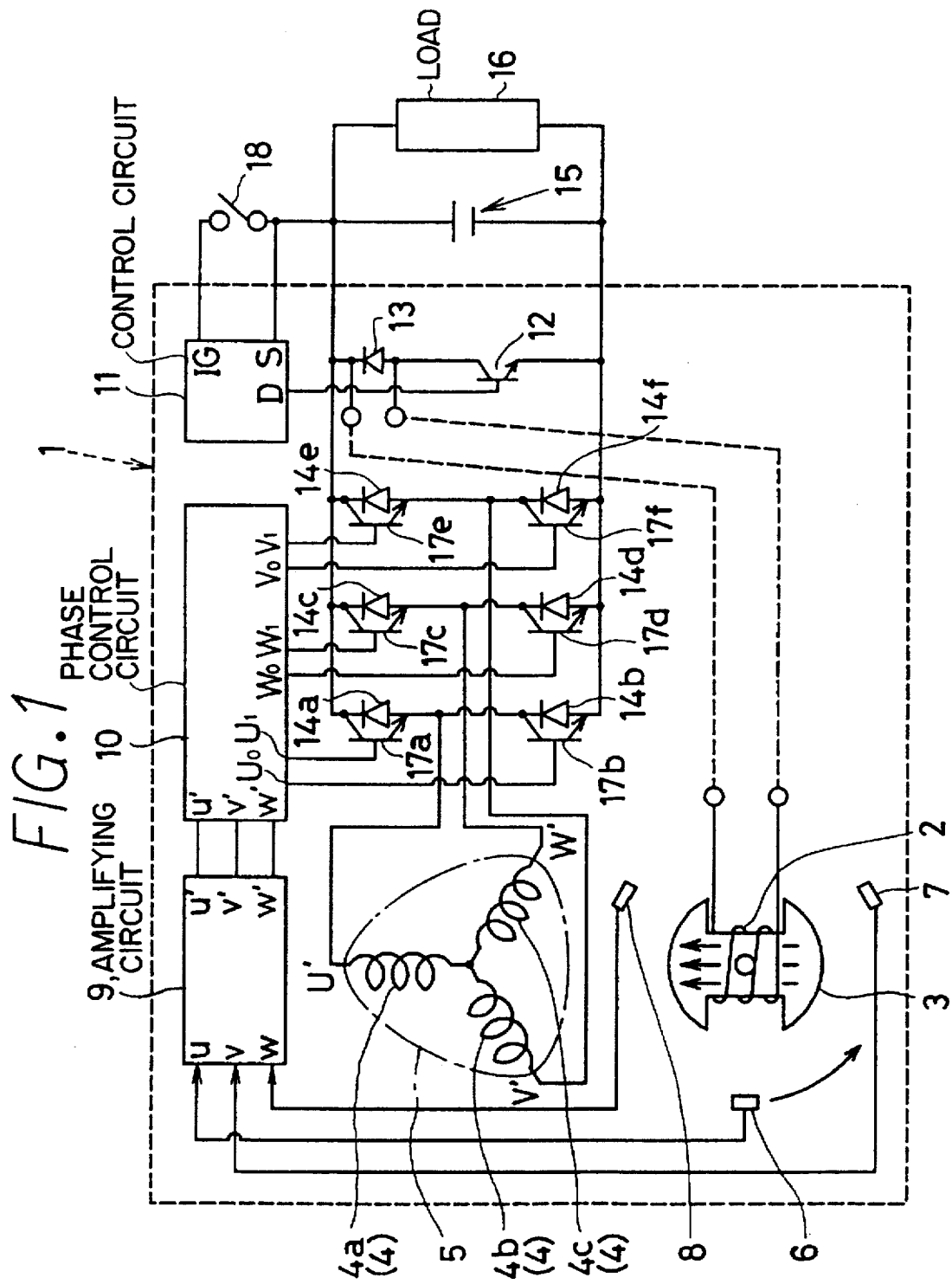
FIG. 1 is an overall circuit diagram of an alternator for a vehicle according to a first embodiment.

FIG. 1 is an overall circuit diagram of an alternator 1 for a vehicle. The alternator 1 for a vehicle according to the first embodiment includes a rotor 3 which has a magnetic field coil 2 and pole cores (not shown), a stator 5 which has an armature coil 4 and an armature core (not shown), a field-exciting-circuit (to be described later) for supplying a field current to the field coil 2, a full-wave-rectifying-circuit (to be described later) which converts the full-waves of the AC-voltages induced in the armature coil 4 into a DC-voltage, a voltage-applying-circuit (to be described later) which applies controlled AC voltages to the armature coil 4 of the stator 5, magnetic sensors 6, 7, and 8 which detect the relative rotational position between the magnetic flux direction of the field coil and the armature coil 4, an amplifying-circuit 9 which amplifies the output signals of the magnetic sensors 6, 7 and 8, a phase control-circuit 10 which controls the voltage-applying-circuit according to the output signals of the amplifying-circuit 9 and a control circuit 11 which controls the field-circuit.

The field coil 2 of the rotor 3 is energized by the field-circuit, when the rotor 3 is rotated (counterclockwise in FIG. 1) by an engine (not shown). The armature coil 4 has Y-connected three-phase-windings 4a, 4b, and 4c, and sequentially generates induced-phase-voltages $E_U$, $E_V$ and $E_W$ in the phase-windings 4a, 4b and 4c respectively at an interval of an electric angle 120° (or phase angle).

The field-exciting-circuit is composed of a transistor 12 which on-off controls the field current supplied to the field coil 2, a diode 13 connected in series with the transistor 12.

The full-wave-rectifying-circuit includes six diodes 14a through 14f which are connected in a bridge and supplies the rectified DC voltage to a battery and an electric load 16.

The voltage-applying-circuit includes six transistors 17a through 17f connected in parallel with each of the diodes 14a through 14f respectively. Each of the transistor 17a, 17b, 17c, 17d, 17e and 17f is connected so that the conducting direction is opposite to that of each of the diodes 14a, 14b, 14c, 14d, 14e and 14f.

Figure 2:
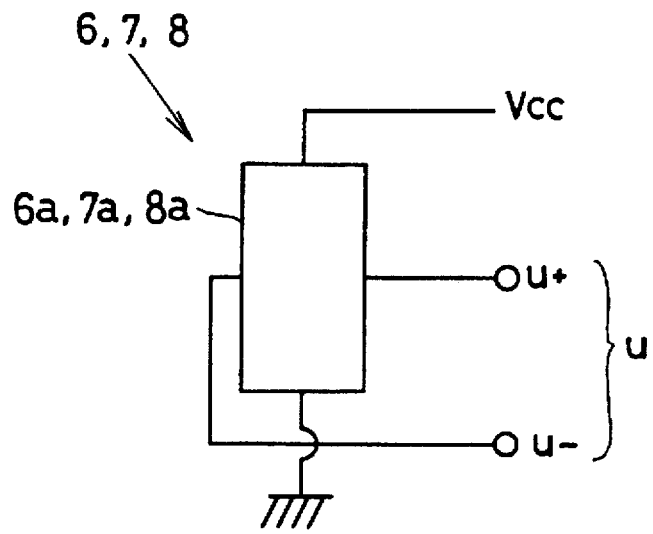
FIG. 2 is a schematic diagram of a magnetic-sensor used in the first embodiment.

The magnetic sensors 6, 7 and 8 are, for instance, Hall elements 6a, 7a and 8a, one of which is shown in FIG. 2. The magnetic sensors 6, 7 and 8 are driven by driving currents and generate voltages u, v and w in response to magnetic-flux-components which are perpendicular to the sensing surface. They are disposed respectively at positions of the armature coil which are respectively a 90°-electric angle behind the phase-windings 4a, 4b and 4c in the rotational direction.

Figure 3:
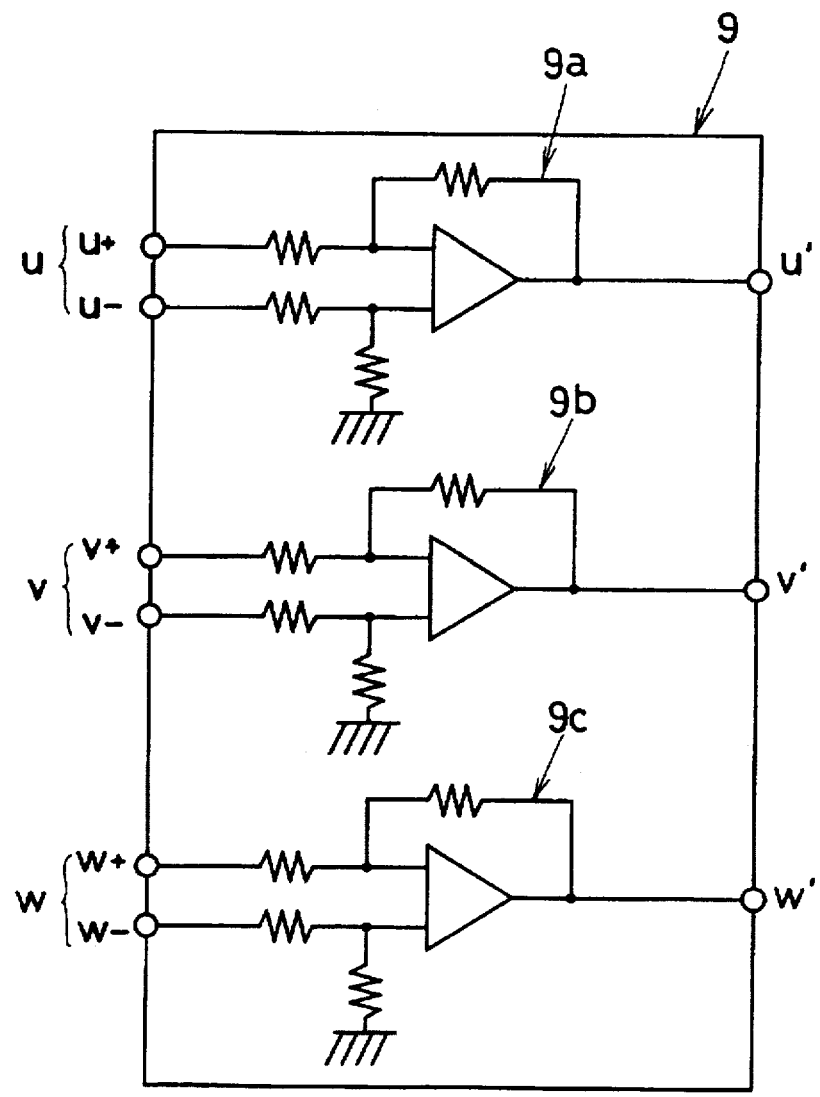
FIG. 3 is a circuit diagram illustrating an amplifying-circuit used in the first embodiment.

The amplifying-circuit 9 shown in FIG. 3 includes three differential amplifiers 9a, 9b and 9c which amplify respective output signal voltages u, v and w of the magnetic sensors 6, 7 and 8 and generates control signals u', v' and w'.

Figure 4:
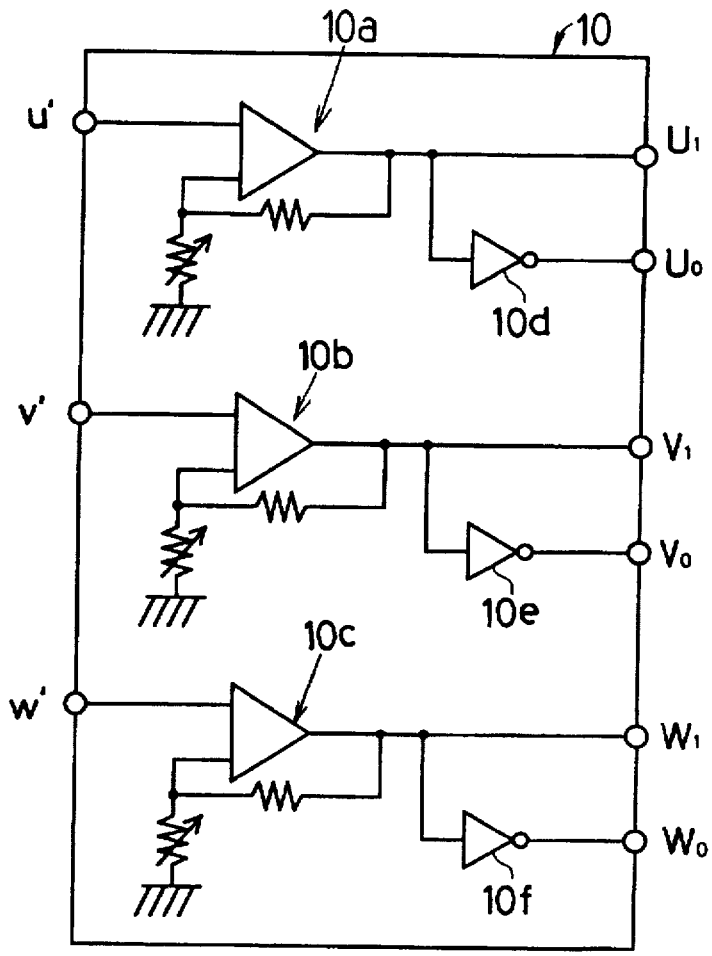
FIG. 4 is a circuit diagram illustrating a phase-control-circuit used in the first embodiment.

The phase-control-circuit 10 shown in FIG. 4 drives the respective transistors 17a through 17f of the voltage-applying-circuit according to signals which are obtained by digital-converting the control signals u', v' and w' of the amplifying-circuit 9. The phase-control-circuit 10 includes three hysteresis-circuits 10a, 10b and 10c which set amplitude of the hysteresis and NOT circuits 10d, 10e and 10f which generate inverted signals $U_0$, $V_0$ and $W_0$ of the output signals $U_1$, $V_1$ and $W_1$ of the hysteresis-circuits 10a, 10b and 10c.

The control circuit 11, which is well known circuit (not shown in detail), includes a terminal S for detecting a battery voltage, a terminal IG connected to the battery through an ignition switch 18 and a terminal D connected to the base of the transistor 12 of the field-exciting-circuit as shown in FIG. 1.

The operation of the embodiment is described next.

When the ignition switch 18 shown in FIG. 1 is turned on and the terminal IG of the control circuit 11 is connected to the battery, the control circuit 11 detects the voltage of the battery 15 and duty-controls the transistor 12 of the field-exciting-circuit to supply an appropriate current to the field coil 2 so that the alternator generates the output power suitable for the battery voltage.

Figure 5A:
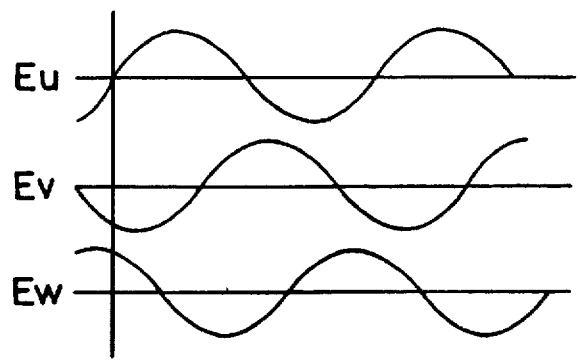
FIG. 5A, FIG. 5B and FIG. 5C are wave-form charts of induced-phase-voltages, induced-line-voltages and sensor-output-signals in the first embodiment.
Figure 5B:
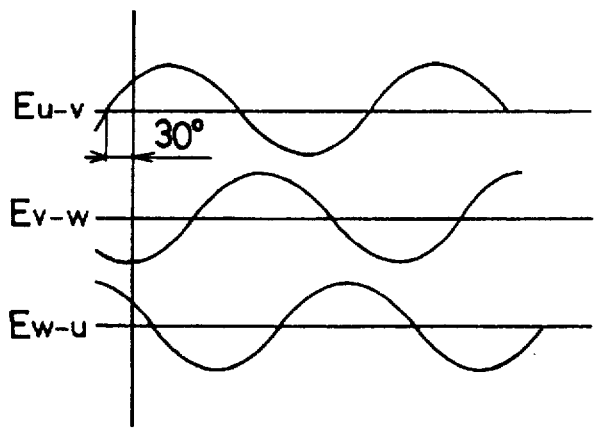

When the rotor 3 is driven by an engine together with the field coil 2, induced-phase-voltages $E_U$, $E_V$ and $E_W$ are generated sequentially in the phase-windings 4a, 4b and 4c of the armature coil 4 of the stator 5 in that order at an interval of 120° phase angle as shown in FIG. 5A. At this moment, induced-line-voltages $E_{U-V}$, $E_{V-W}$ and $E_{W-U}$ appear respectively across couples of the adjacent phase-windings 4a and 4b, phase-windings 4b and 4c, and phase-windings 4c and 4a have respective phases which lead a 30° electric-angle ahead of the respective induced-phase-voltages $E_U$, $E_V$ and $E_W$ as shown in FIG. 5B. It is noted that: $E_{U-V}=E_U-E_V$, $E_{V-W}=E_V-E_W$, and $E_{W-U}=E_W-E_U$.

Figure 5C:
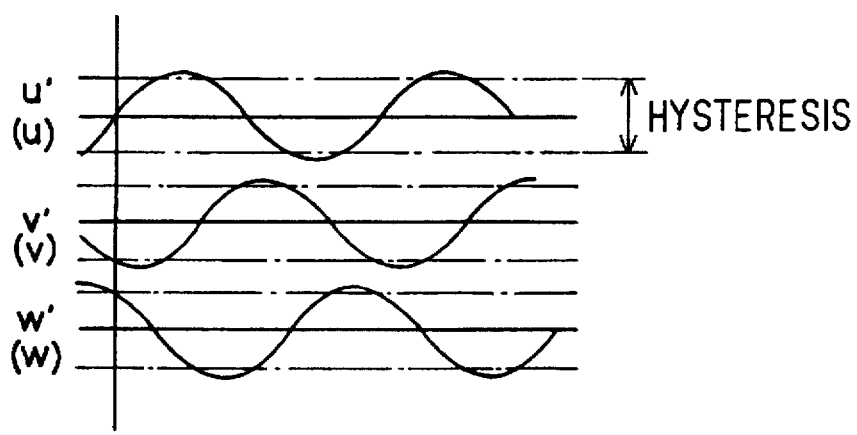

As the rotor 3 rotates, the respective sensors 6, 7 and 8 generate sensor-output-signals u, v and w each of which has a phase difference of an electric angle 120° from one another. Since each of the magnetic sensors 6 through 8 is disposed at a position of an electric angle 90° behind corresponding one of the phase-windings 4a, 4b and 4c, each output-signal of the magnetic sensors u, v and w has the same phase angle as each of the induced-phase-voltages $E_U$, $E_V$ and $E_W$ as shown in FIG. 5C.

Each of the sensor-output-signals u, v and w is amplified by the amplifying-circuit 9 and its output signals u', v' and w' are taken into the phase-control-circuit 10.

Figure 6A:
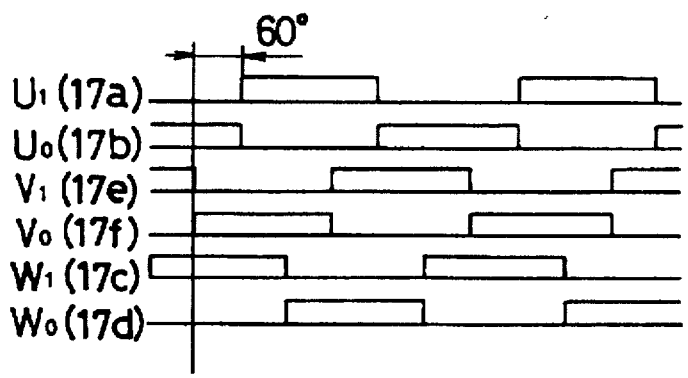
FIG. 6A, FIG. 6B and FIG. 6C are wave-form charts of transistor-input-signals, applied-line-voltages and applied-phase-voltages in the first embodiment.
Figure 6B:
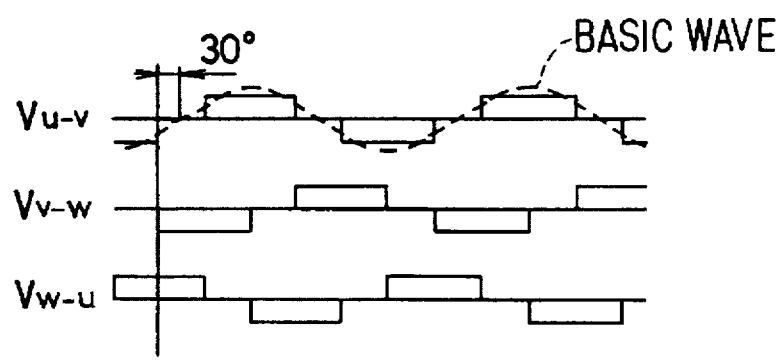
Figure 6C:
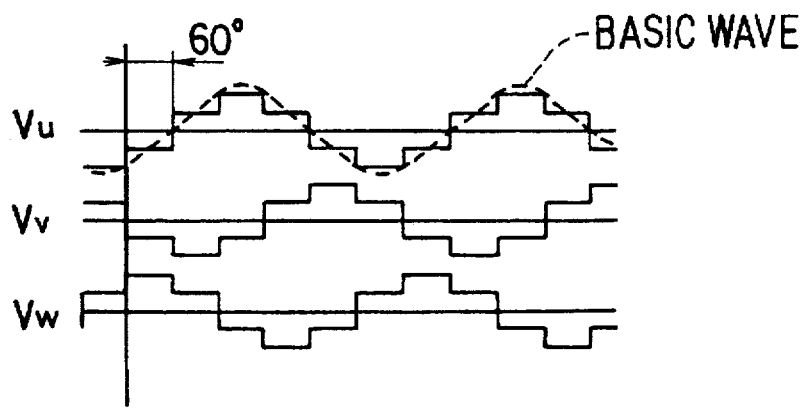

The phase-control-circuit 10, which includes the hysteresis-circuits 10a, 10b and 10c, generates digital signals $U_0$, $U_1$, $V_0$, $V_1$, $W_0$ and $W_1$ shown in FIG. 6A which lag respectively an electric angle of 60° behind the sensor-output-signals u, v and w (or the induced-phase-voltages $E_U$, $E_V$ and $E_W$). The transistors 17a, 17b, 17c, 17d, 17e and 17f of the voltage-applying-circuit are driven respectively by the digital signals $U_0$, $U_1$, $V_0$, $V_1$, $W_0$ and $W_1$, and, consequently, applied-AC-voltages $V_{U-V}$, $V_{V-W}$ and $V_{W-U}$ (or applied-line-voltages) shown in FIG. 6B are applied respectively across couples of the adjacent phase-windings 4a and 4b, the phase windings 4b and 4c and the phase windings 4c and 4a.

Since the applied-line-voltages (or applied-AC-voltages) $V_{U-V}$, $V_{V-W}$ and $V_{W-U}$ lag an electric angle 30° behind the induced-phase-voltages $E_U$, $E_V$ and $E_W$, respectively, they lag an electric angle 60° behind the induced-line-voltages $E_{U-V}$, $E_{V-W}$ and $E_{W-U}$ (shown in FIG. 5B), respectively. Thus, applied-phase-voltages $V_U$, $V_V$ and $V_W$ shown in FIG. 6C also lag an electric angle 60° behind the induced-phase-voltages $E_U$, $E_V$ and $E_W$ (shown in FIG. 5A) respectively.

The lag angle of the applied-line-voltages $V_{U-V}$, $V_{V-W}$ and $V_{W-U}$ behind the induced-line-voltages $E_{U-V}$, $E_{V-W}$ and $E_{W-U}$ can be changed by changing the hysteresis-amplitude of the hysteresis-circuits 10a, 10b and 10c from 0° to 90°. However, a wider lag angle will be obtained if the positions of the magnetic sensors 6, 7 and 8 are changed.

Figure 25:
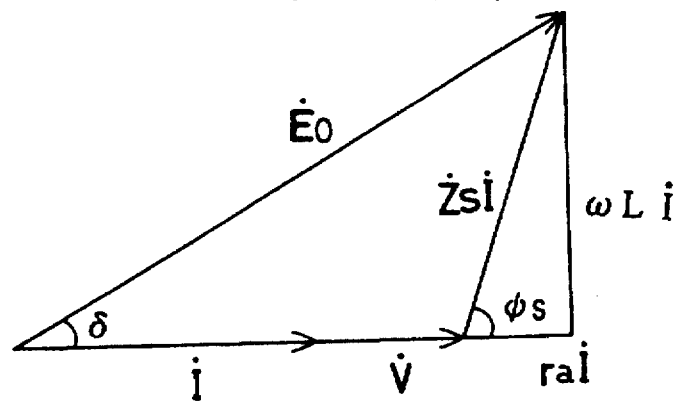
FIG. 25 is a vector chart illustrating generating operation of the conventional system.
Figure 36:
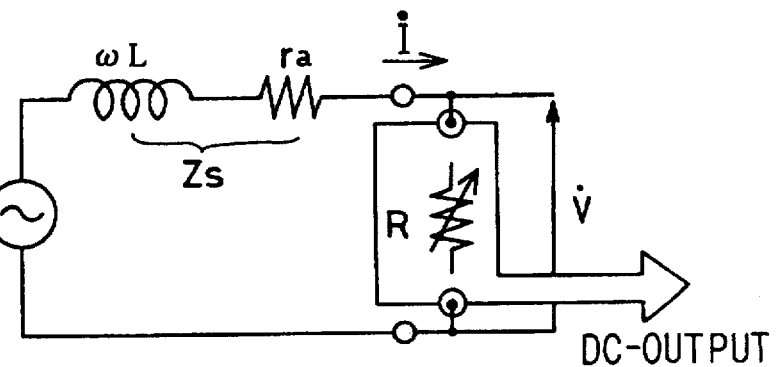
FIG. 36 is a single-phase circuit diagram illustrating the principle of the electricity generation.
Figure 37:
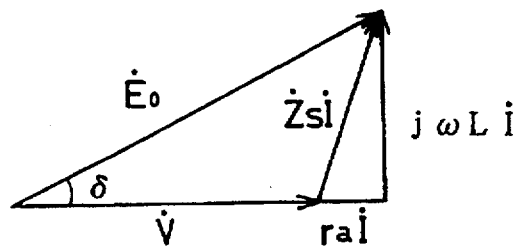
FIG. 37 is a vector chart of the electricity generation in the conventional alternator.
Figure 38:
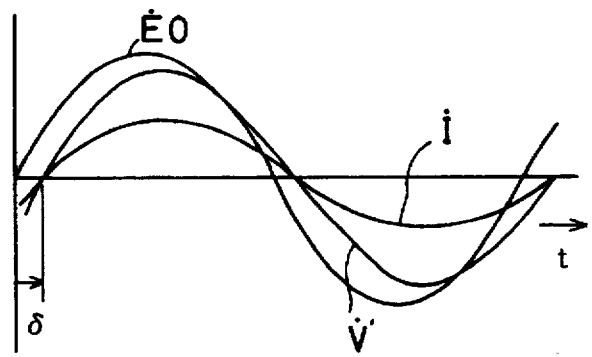
FIG. 38 is a voltages-current wave-form chart of the conventional generation system.
Figure 39:
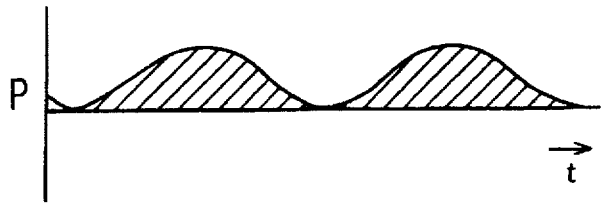
FIG. 39 is a graph showing power generated by the conventional system.

The effects of the generating system according to the first embodiment are compared with a conventional system with reference to FIG. 25 and FIG. 36 next.

In the conventional generating system, an armature resistance $r_a$, an armature inductance L and a load resistance R are series-connected and an AC-voltage source (or induced-phase-voltage $E_0$) is applied thereacross. Thus, a voltage V across the load resistance R lags a phase difference δ behind the induced-phase-voltage as shown in FIG. 25.

Since the phase difference δ is determined necessarily by circuit constants such as R, $r_a$ and ωL, as discussed before, a phase current I is given by the following equation, if δ is regarded as 0° (if the rotational speed is low and ω is small enough to be neglected), wherein k and k' are coefficients.

$$I = (E_0 - V)/Z_s \quad [E3]$$
$$= (E_0 - V)/r_a$$
$$= (k\omega - V)/r_a$$

If δ is regarded as 90° when the rotational speed is high (when ωL is large enough to neglect the resistance $r_a$), the phase current is given by the following equation.

$$I = E_0/Z_s \quad [E4]$$
$$= E_0/\omega L$$
$$= k'/r_a$$

Figure 7:
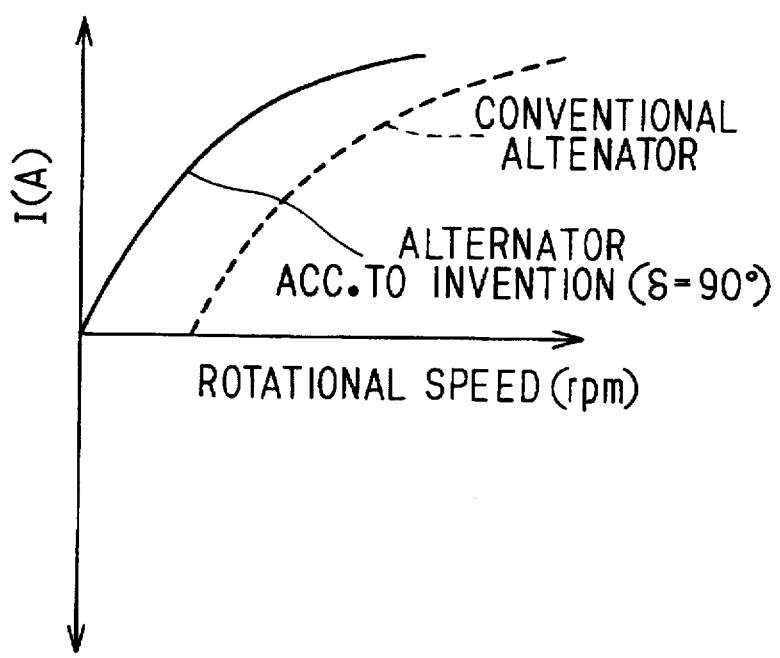
FIG. 7 is a graph comparing the alternator according to the first embodiment and a conventional alternator.

As a result, the output current of the conventional generating system relative to the rotational speed is generated as indicated by a dotted line in FIG. 7.

Figure 8:
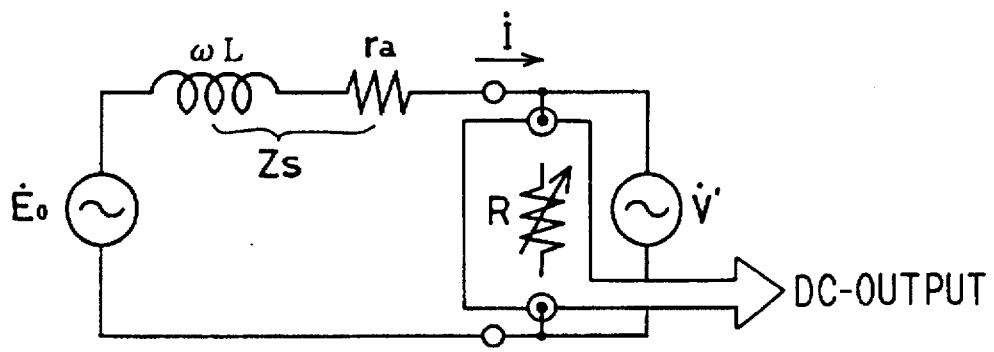
FIG. 8 is a vector chart illustrating the principle of electricity generation of a single-phase model for the first embodiment.

On the other hand, δ can be changed by the timing of driving the transistor 17a, 17b, 17c, 17d, 17e and 17f of the voltage-applying-circuit in the generating system (a single-phase-model thereof is shown in FIG. 8) according to this embodiment.

Figure 9:
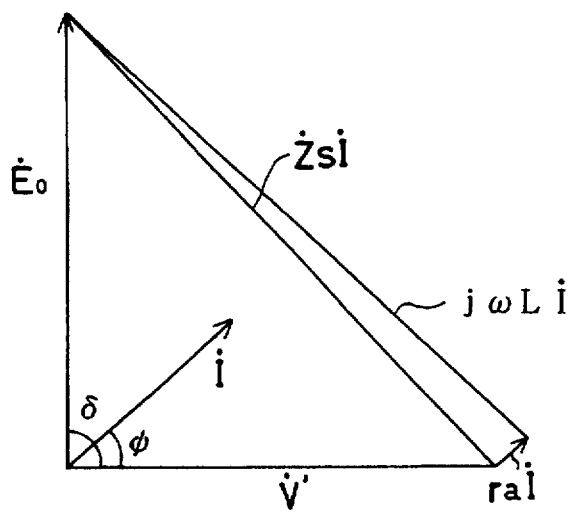
FIG. 9 is a vector chart illustrating a generation system according to the first embodiment.
Figure 10:
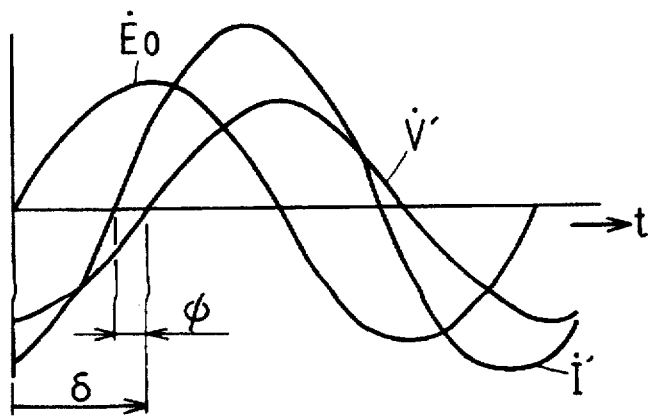
FIG. 10 is a graph showing voltage-current wave-forms of the first embodiment.
Figure 11:
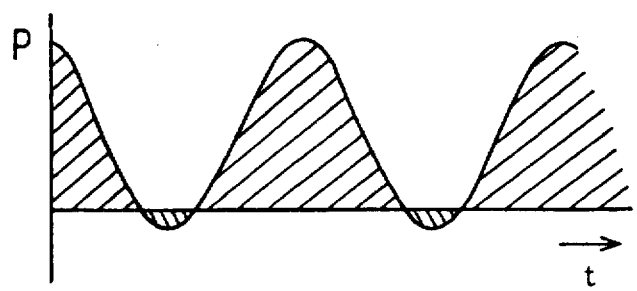
FIG. 11 is a graph showing a generated power of the first embodiment.

In a single-phase model shown in FIG. 9, a terminal voltage V is controlled to lag behind an induced-phase-voltage $E_0$ by an electric angle δ, e.g. 90°, a phase current leads ahead of the terminal voltage V by an electric angle ψ and becomes a lead-phase-current. If δ is set to 90° when the rotational speed is low (ω is small) the phase current I is given by the following equation.

$$I = E_0/Z_s \quad [E5] \text{ and FIG. 10,}$$
$$= E_0/r_a$$
$$= k\omega/r_a$$

When the rotational speed is high (ω is large), the phase current I is given by the following equation.

$$I = E_0/Z_s \quad [E6]$$
$$= E_0/\omega L$$
$$= k'/r_a$$

As a result, the output current relative to the rotational speed is obtained as indicated by a solid line in FIG. 7 in this generating system according to the present embodiment. That is, the generating system according to the present embodiment generates more output than the conventional generating system in a low rotational speed range as shown in FIG. 7.

Figure 12:
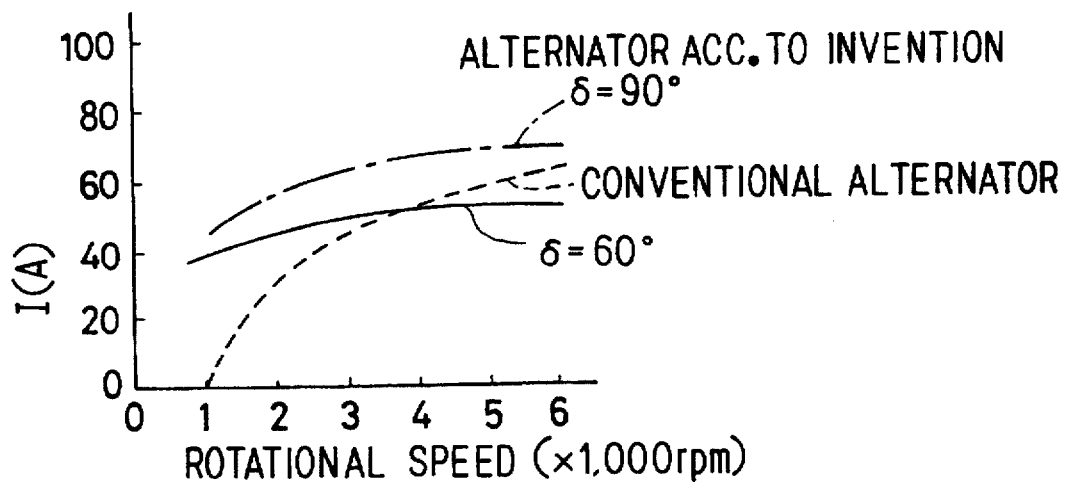
FIG. 12 is a graph showing the relationship between the rotational speed and the generated current of the first embodiment and that of the conventional alternator.
Figure 13:
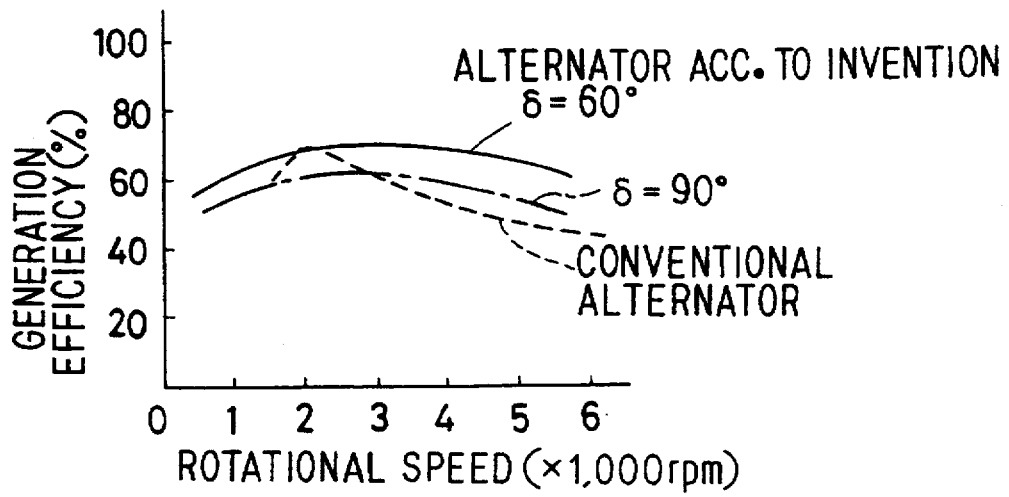
FIG. 13 is a graph showing the relationship between the rotational speed and the generation efficiency of the first embodiment and that of the conventional alternator.

The relationships between the lag angle δ (the lag angle of the applied-line-voltages $V_{U-V}$, $V_{V-W}$ and $V_{W-U}$ relative to (behind) the induced-line-voltages $E_{U-V}$, $E_{V-W}$ and $E_{W-U}$) and the generated current and the generation efficiency are shown in FIGS. 12 and 13. The generating system according to the first embodiment provides its maximum output power over almost the entire speed range when the lag angle δ is 90°, as indicated by a one-dot-chain-line shown in FIG. 12, and provides the most efficient output power over almost the entire speed range when the lag angle δ is 60°, as indicated by a solid line shown in FIG. 13. That is, the maximum power is obtained when the lag angle is set to 90° (within a range from 75° to 110°) and the maximum efficiency is achieved when the lag angle is set to 60° (within a range from 40° to 75°).

A second embodiment of the present invention is described next.

Figure 14:
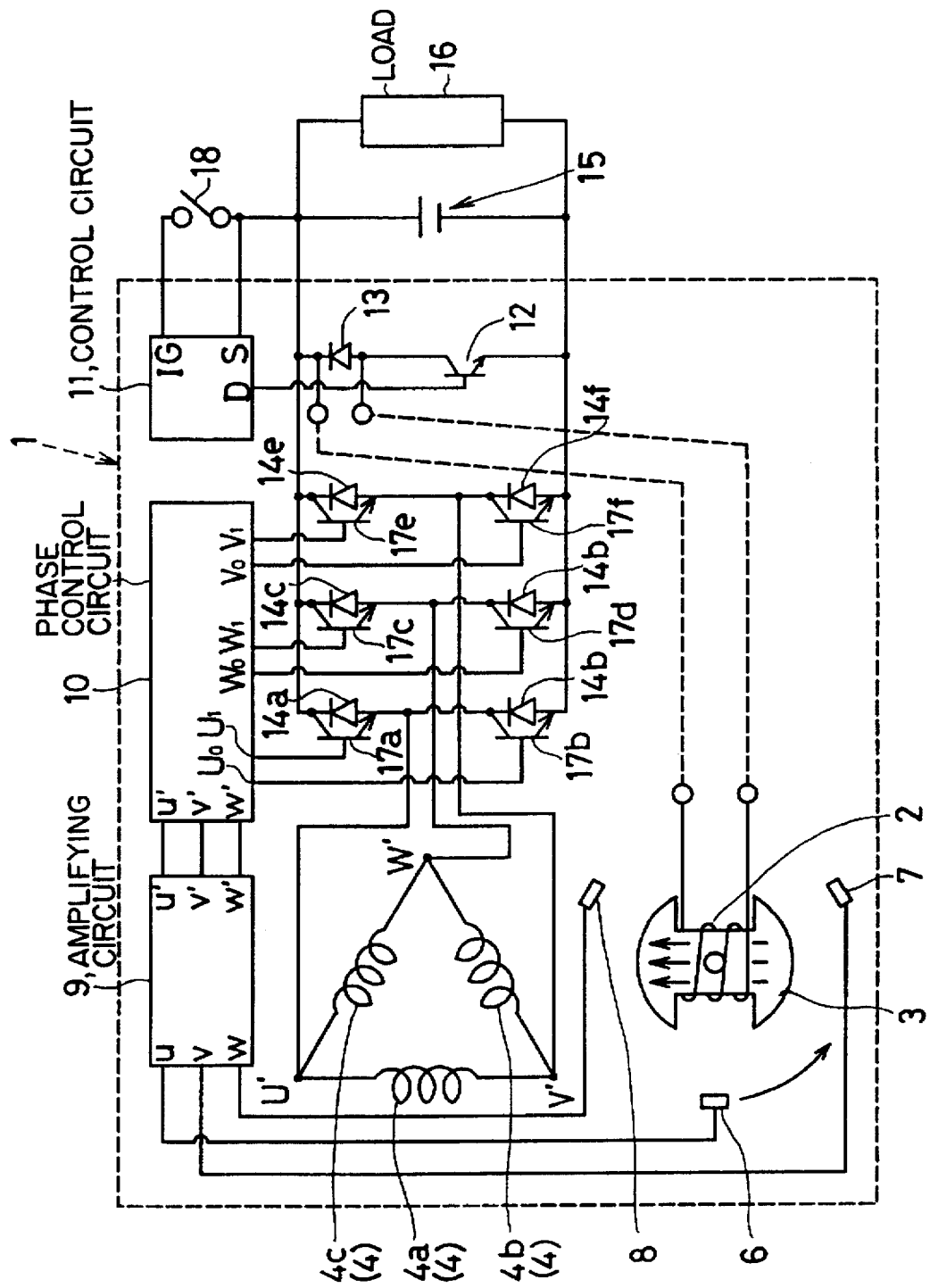
FIG. 14 is an overall circuit diagram of an alternator according to a second embodiment of the present invention.
Figure 15A:
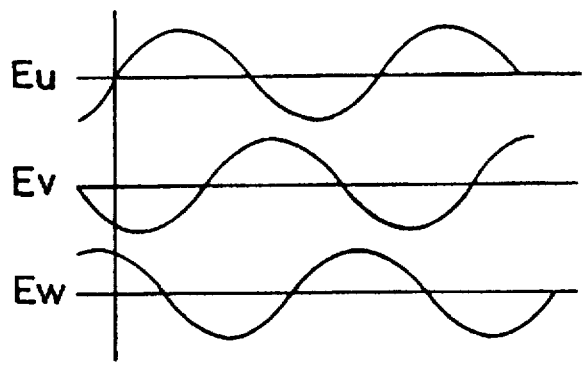
FIG. 15A and FIG. 15B are graphs showing wave-forms of induced-phase-voltages and sensor-output-signals of the alternator according to the second embodiment.
Figure 15B:
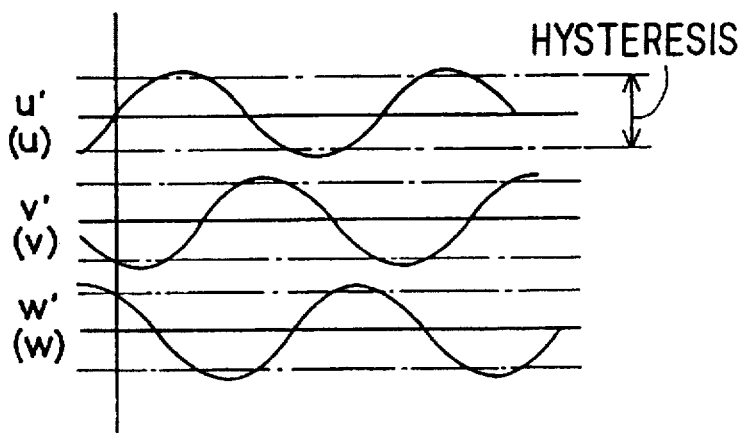

FIG. 14 is an overall circuit diagram illustrating an alternator 1 according to the second embodiment.

Figure 16A:
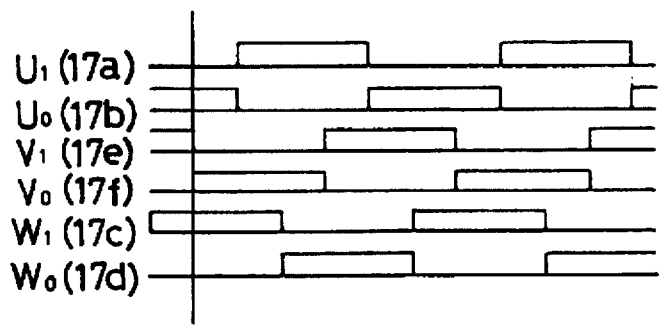
FIG. 16A and FIG. 16B are graphs showing wave-forms of transistor-input-signals and applied-phase-voltages of the alternator according to the second embodiment.
Figure 16B:
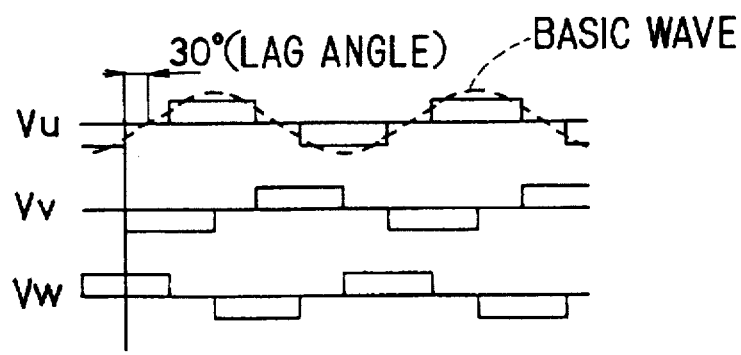

The embodiment includes three Δ-connected phase-windings 4a through 4c, and AC-voltages (or applied-phase-voltages) of approximated sinusoidal waves shown in FIG. 16B which lag an electric angle 30° behind the induced-phase-voltages $E_U$, $E_V$ and $E_W$ of the Δ-connected phase-windings 4a through 4c are applied thereto respectively.

A third embodiment of the present invention is described next.

Figure 17:
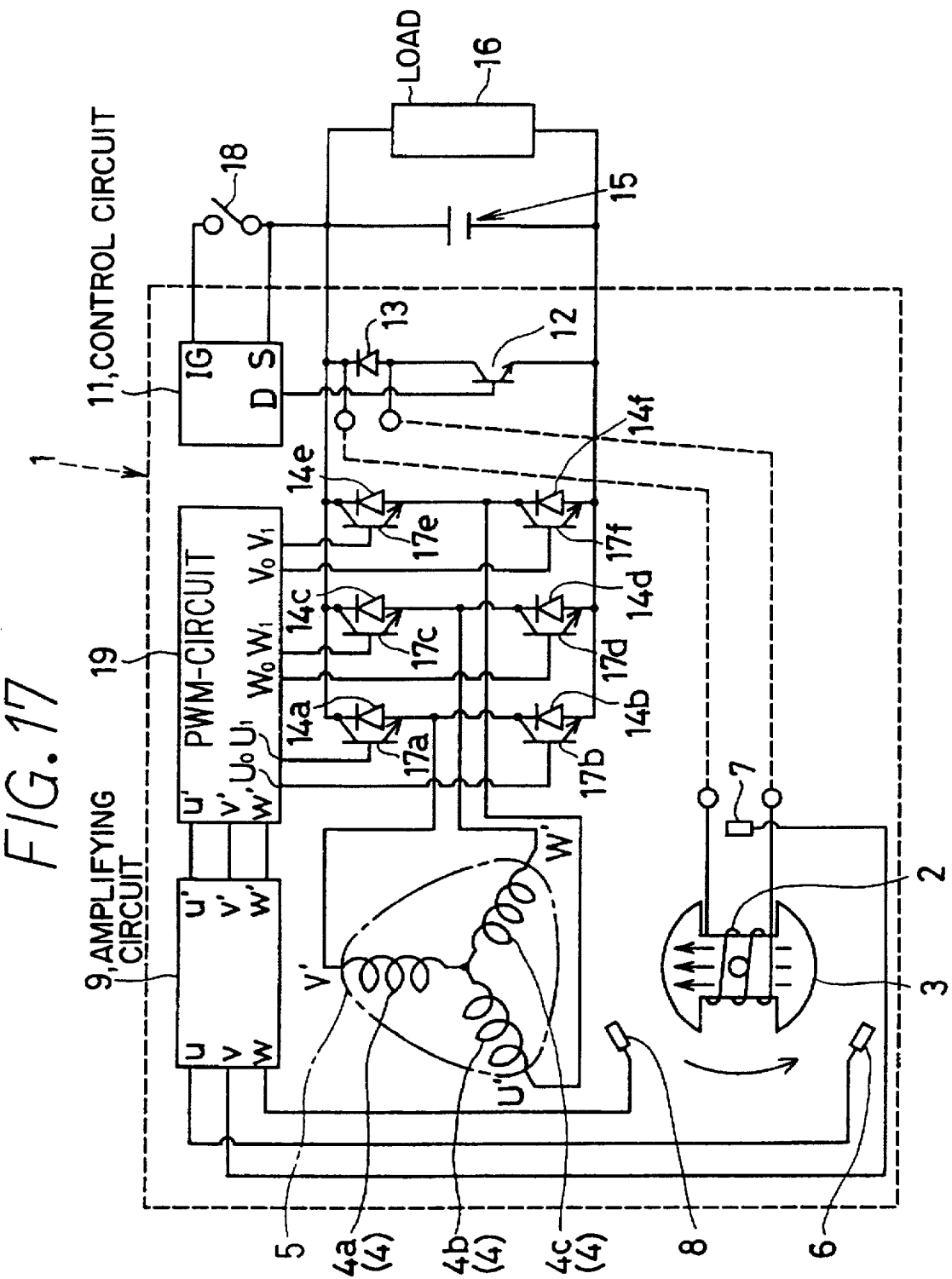
FIG. 17 is an overall circuit diagram of an alternator according to a third embodiment of the present invention.

FIG. 17 is an overall circuit diagram of an alternator 1 according to the third embodiment.

Figure 18A:
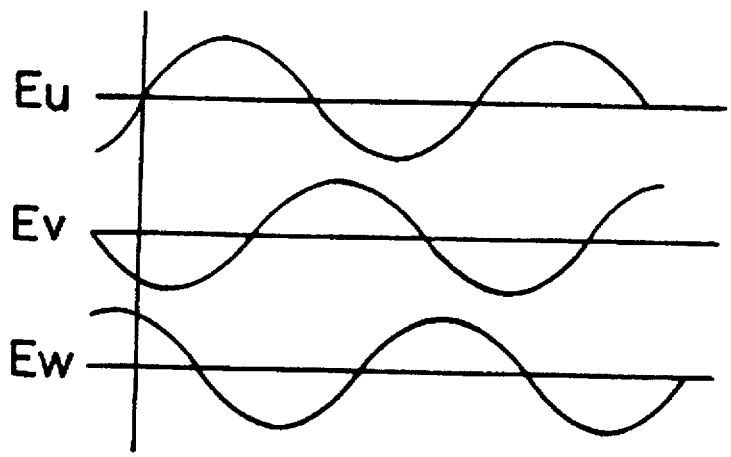
FIG. 18A, FIG. 18B and FIG. 18C are graphs showing wave-forms of induced-phase-voltages, induced-line-voltages and sensor-output-signals in the third embodiment.
Figure 18B:
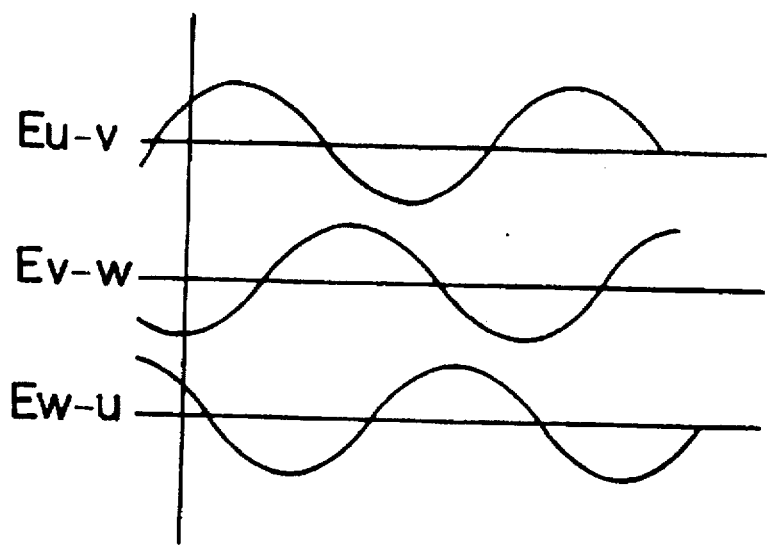
Figure 18C:
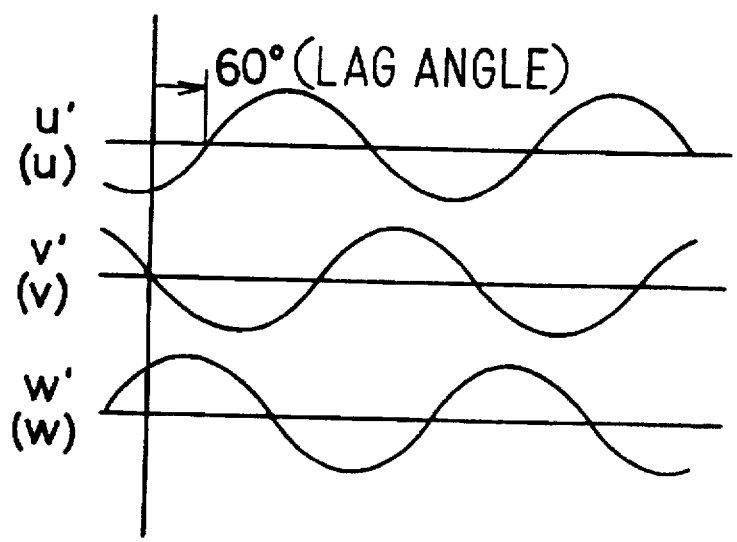
Figure 19A:
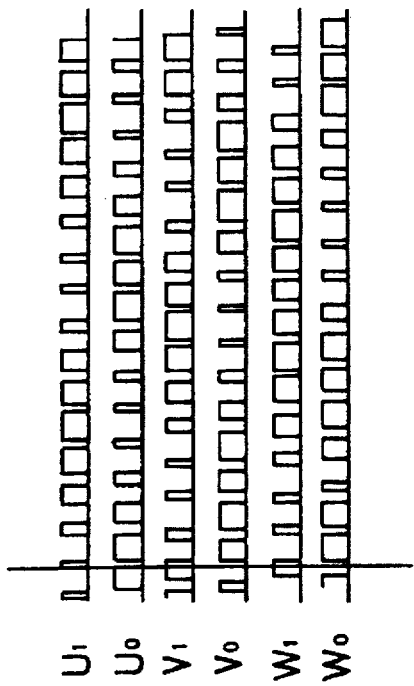
FIG. 19A and FIG. 19B are graphs showing wave-forms of transistor-input-signals and applied-phase-voltages of the alternator according to the third embodiment.
Figure 19B:
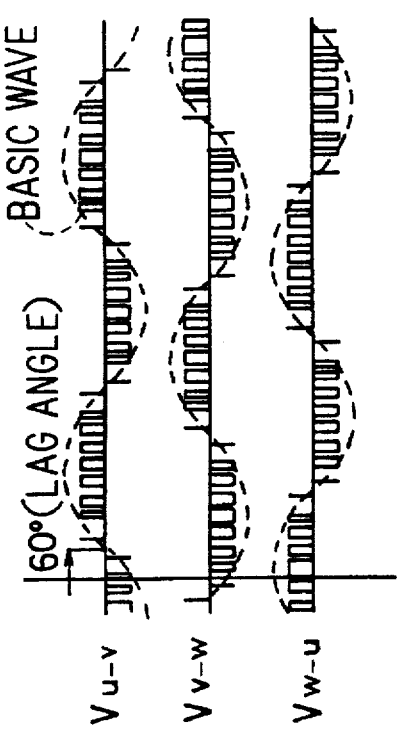

The third embodiment includes a PWM (or pulse width modulation) circuit 19 instead of the phase-control-circuit 10. The PWM-circuit 19 drives the transistors 17a through 17f of the voltage-applying-circuit respectively according to pulse signals shown in FIG. 19A based on the sensor output signals shown in FIG. 18C. Accordingly, the AC-voltages shown in FIG. 19B composed of a group of rectangular pulses are applied across couples of the adjacent phase-windings 4a and 4b, phase-windings 4b and 4c and phase-windings 4c and 4a respectively at a 60° electric angle behind the corresponding line voltages induced in the stator 5.

A fourth embodiment of the present invention is described next.

Figure 20:
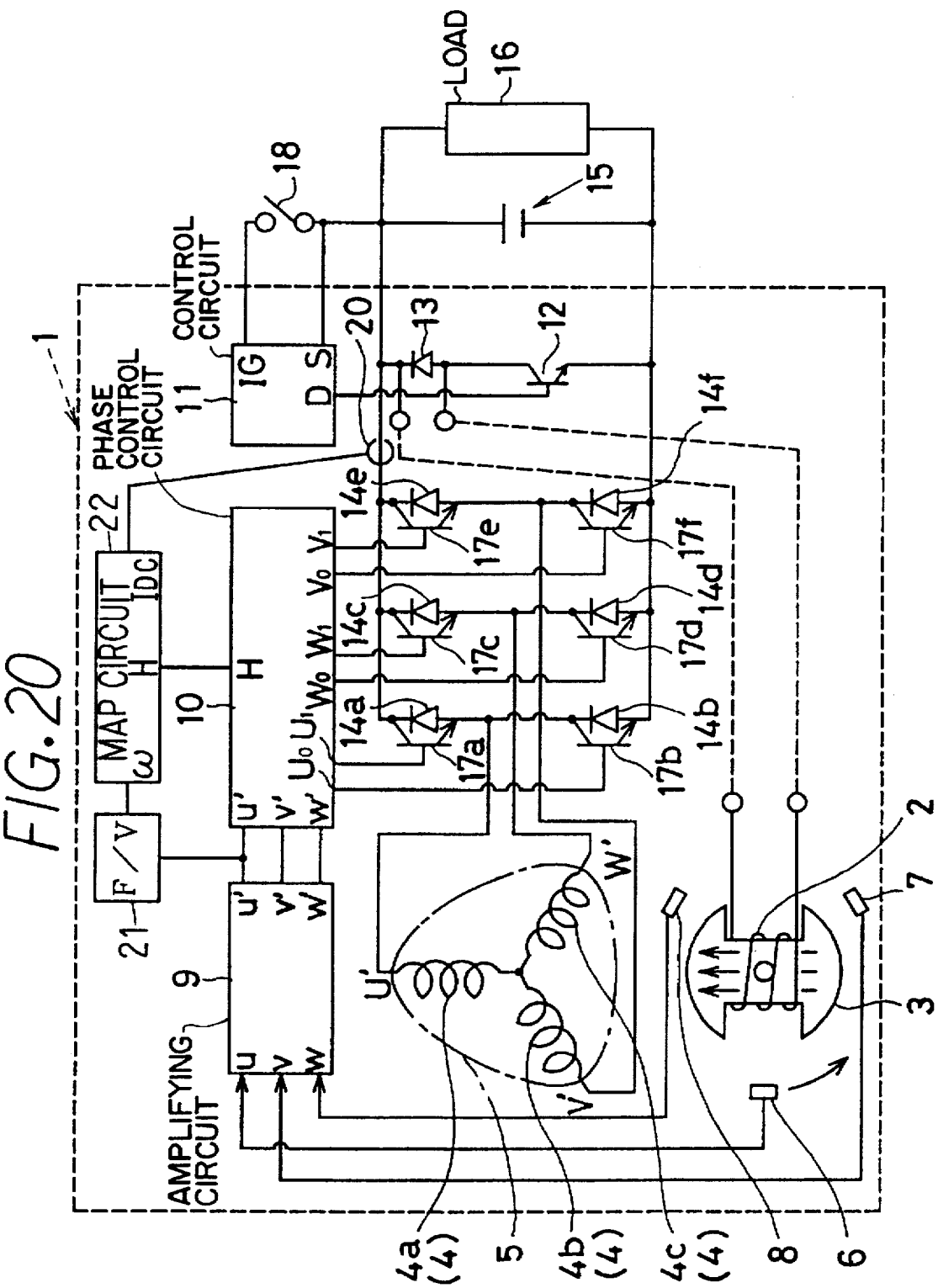
FIG. 20 is an overall circuit diagram of an alternator according to a fourth embodiment of the present invention.

FIG. 20 is an overall structural view illustrating an alternator 1 according to the fourth embodiment. The alternator 1 is equipped, in addition to the elements described with reference to the first embodiment (the description is omitted), with a current sensor 20 which detects DC-output of the full-wave-rectifying-circuit, F/V-Converter 21 which calculates an electric-angular-velocity according to the sensor output signals u of the magnetic sensor 6 and a map-circuit 22 which controls the phase-control-circuit 10.

Figure 21:
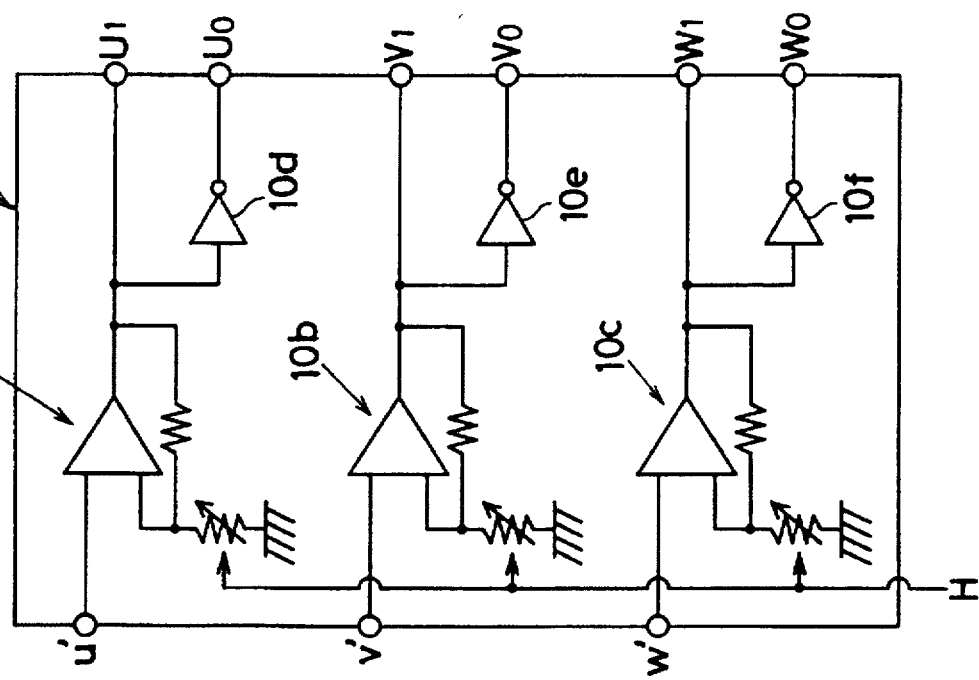
FIG. 21 is a circuit diagram illustrating a phase-control-circuit used in the fourth embodiment.

The map-circuit 22 is composed of a control map (not shown) which stores therein lag angles which give a minimum loss at a given relative rotational speed between the rotor 3 and the stator 5 and at a given amount of the generated power, in combination with the field currents and the phase voltages. A hysteresis-amplitude which corresponds to a set lag angle stored in the control map is applied to the phase-control-circuit 10 shown in FIG. 21.

An idea of enhancing the generator efficiency is described next.

Figure 22:
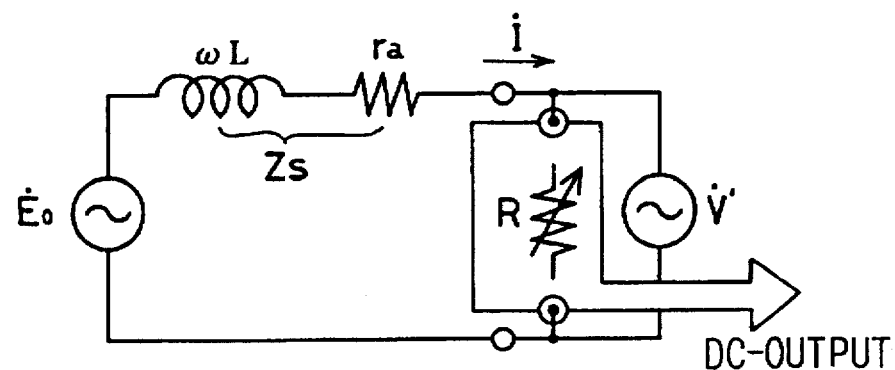
FIG. 22 is a vector chart illustrating the principle of electricity generation of a single-phase model for the fourth embodiment.
Figure 23:
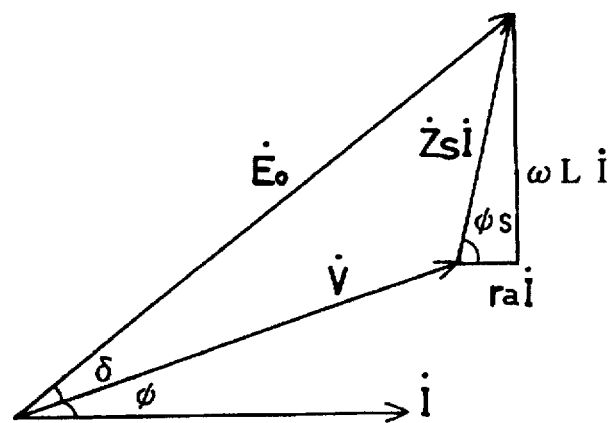
FIG. 23 is a vector chart illustrating generating operation of the system according to the fourth embodiment.

The alternator 1 of this embodiment may be expressed by the single-phase model shown in FIG. 22 and a vector diagram in FIG. 23.

The phase-current I is given by the following equation.

$$i = (E_0 - \dot{V})/Z_S \quad [E7]$$
$$= (E_0 - \dot{V})/(Z_S \exp(j\psi_S))$$
$$i = I\exp(-j\psi)$$
$$= (E/Z_S)\exp(-j(\psi-\delta)) - (V/Z_S)\exp(-j\psi_S)$$

An output P, which is a DC-current, is given by the following equation in case of the three-phase generator.

$$P = I_{DC}V_{DC} \quad [E8]$$
$$= 3VI\cos\psi$$
$$= 3(VE_0/Z_S)\sin\delta$$

The symbols used in the above equations represent as follows:

P: generated power
I: phase-current
$E_0$: induced-phase-voltage ( which is a function of the magnetic field current $I_f$)
V: terminal voltage (constant)
$Z_S$: synchronous impedance (expressed as $\sqrt{\{(\omega L)^2 + r_a^2\}}$)
L: synchronous inductance
$r_a$: armature resistance
δ: lag angle (or load angle) ψ: power factor angle
$\psi_S$: which equals to $\tan^{-1}(\omega L/r_a)$
ω: electric-angular-velocity
n: rotational speed (rpm)
$I_{DC}$: DC-output current
$V_{DC}$: DC-output voltage The electricity power generation is discussed next by using a circle diagram which diagrams the above-listed equations of the phase-current I and the generated power P.

Figure 24:
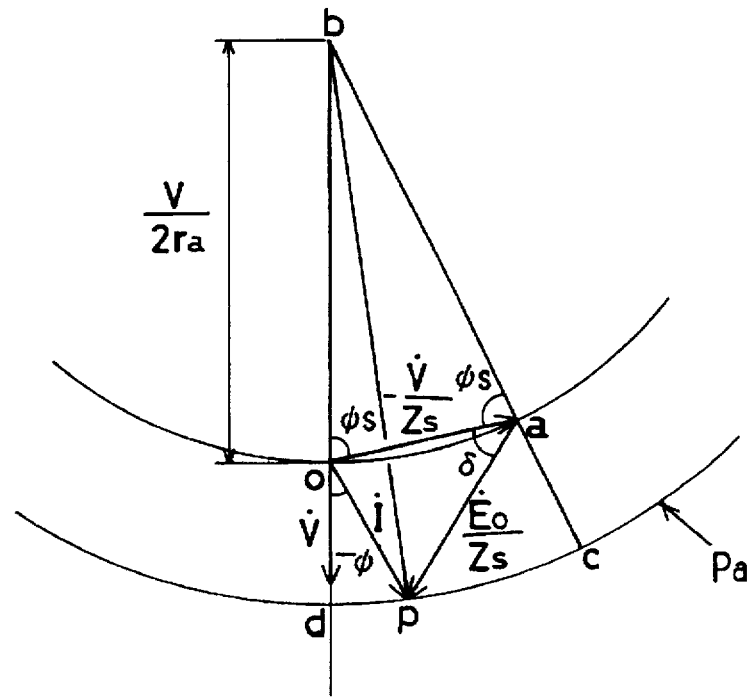
FIG. 24 is an output circle illustrating the generating operation of the system according to the fourth embodiment.

The locus of point p where the generated power becomes constant as shown in FIG. 24 is given as follows.

$$\overline{bp}^2 = \overline{ab}^2 + \overline{ap}^2 - 2 \cdot \overline{ab} \cdot \overline{ap} \cdot \cos(\psi_S + \delta) \quad [E9]$$
$$= (V/(2r_a))^2 + (E_0/Z_S)^2 -$$
$$2(V/(2r_a))(E_0/Z_S)\cos(\psi_S + \delta)$$
$$= (V/(2r_a))^2 -$$
$$(1/r_a)\{(VE_0/Z_S)\cos(\psi_S + \delta) -$$
$$(E_0^2/Z_S)\cos\psi_S\}$$

wherein a b=oa/2cos$\psi_s$=V/2Z$_S$cos$\psi_S$=V/2r$_a$

Normally, $r_a<\omega$, therefore $\psi_S \approx \pi/2$, then it is substituted to the above equation, and the following equation is given.

$$\overline{bp}^2 = (V/(2r_a))^2 + (1/r_a)(VE_0/Z_S)\sin\delta \quad [E10]$$
$$= (1/r_a)(V^2/(4r_a) + P/3)$$
$$\therefore \overline{bp} = \sqrt{\{(V^2/(4r_a) + P/3)/r_a\}}$$

Accordingly, if the generated power P is constant, $\overline{bp}$ (distance between points b and p) is constant. In other words, a circle, which has the point b as the center and $\overline{bp}$ as the radius, becomes the locus for the point where the generated power P is constant. The circle is referred to as the output circle $P_a$ hereafter.

Now, it is assumed that the rotational speed n and the generated power P are constant. In this moment, the synchronous impedance $Z_s$ is also constant because the rotational speed n is constant.

Since the rotational speed n is constant, the point p moves along the output circle $p_a$. When the point p comes to a point c, the induced voltage $E_0$ becomes minimum, in other words, the magnetic-field-current $I_r$ becomes minimum. The induced voltage $E_0$ increases as the magnetic-field-current $I_f$ increases and the point p moves clockwise on the output circle $p_a$. Therefore, the phase-current I decreases and it becomes minimum at a point d. At this moment, the power factor angle ψ=0°, that is the power factor becomes 100%.

Figure 26:
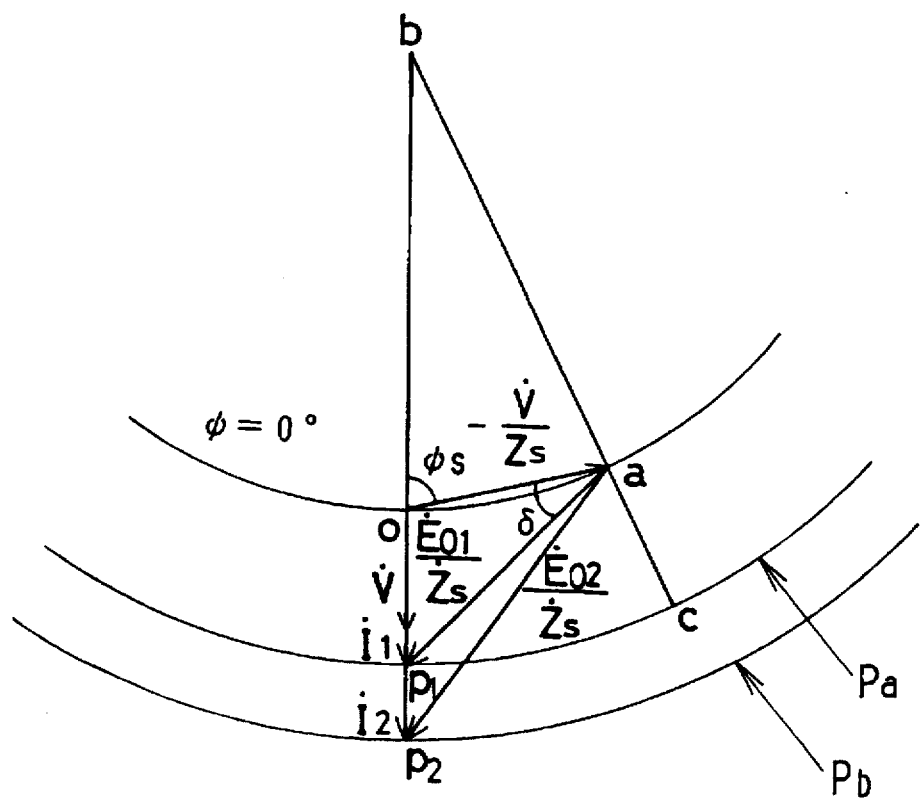
FIG. 26 is an output circle illustrating the generating operation of the conventional system.

In the conventional way of generation in which only the magnetic-field-current $I_f$ is controlled, the power factor is always 100%. The vector diagram and the output circle diagram thereof are shown in FIGS. 25 and 26.

The efficiency of the conventional generator is given by the following equation.

$$\pi = P/(P+P_C+P_f+Pi+P_m+P_\alpha), \quad [E11]$$

wherein:

P: generated power
$P_C$: copper loss (armature copper loss)
$P_f$: magnetic field loss (copper loss of the field coil)
$P_i$: iron loss
$P_m$: machine loss
Pα: other losses Pi, $P_m$ and $P_\alpha$ are nearly constant under a constant terminal voltage and a constant rotational speed.

$P_C$ and $P_f$ are respectively given by the following equations.

$$P_C = 3r_a I^2 \quad [E12]$$
$$P_f = r_f I_f^2$$

In the conventional way of generation in which only the magnetic-field-current $I_f$ is controlled, only the induced voltage $E_0$ is controlled to get an output power P. Therefore, if the magnetic-field-current $I_f$ is determined, the phase-current I is necessarily given and the total ($P_c+P_f$) of the field loss and the copper loss cannot be controlled to a minimum value.

On the other hand, there is a point, where the total loss ($P_c+P_f$) is minimum, in other words, where the maximum efficiency is obtained, on the output circle shown in FIG. 24.

That is, the embodiments according to the present invention, in which the load angle δ is controlled, realizes the above operation.

The embodiments aim to carry a highly-efficient generation with optimum phase-current I and magnetic-field-current $I_f$.

The operation of the fourth embodiment is described next.

When the ignition switch 18 is turned on and the terminal IG of the control circuit 11 and the battery 15 is connected, the control circuit 11 detects a voltage of the battery 15 and duty-control the transistor 12 of the field-exciting-circuit so that the battery voltage becomes its target voltage (e.g. 14 V), thereby supplying a suitable field current to the field coil 2.

Figure 27A:
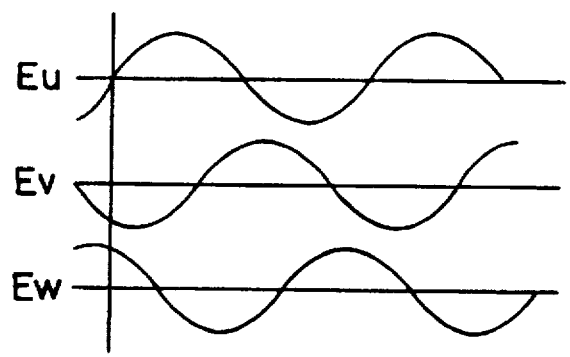
FIG. 27A, FIG. 27B and FIG. 27C are graphs showing wave-forms of induced-phase-voltages, induced-line-voltages and sensor-output-signals in the fourth embodiment.
Figure 27B:
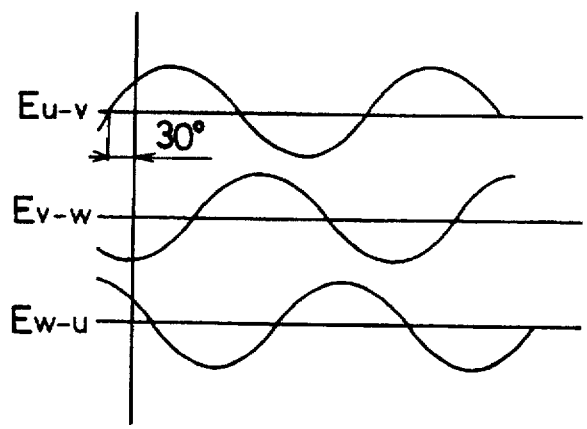

When the rotor 3 having the magnetic-field-coil 2 thereon is driven by an engine, the induced-phase-voltages $E_U$, $E_V$ and $E_W$ are generated in the phase-windings 4a, 4b and 4c respectively at an interval of 120° phase-angle in that order as shown in FIG. 27A. The induced line voltages $E_{U-V}$, $E_{V-W}$ and $E_{W-U}$ appearing across couples of the adjacent phase windings 4a and 4b, phase-windings 4b and 4c and phase windings 4c and 4a have a lead angle of 30° ahead of the induced-phase-voltages $E_U$, $E_V$ and $E_W$ respectively as shown in FIG. 27B. Incidentally, $E_{U-V}=E_U-E_V$, $E_{V-W}=E_V-E_W$ and $E_{W-U}=E_W-E_U$.

As the rotor 3 rotates, the sensor-output-signals u, v and w are generated in the magnetic sensors 6, 7 and 8 at a phase difference of electric angle 120° one after another.

Figure 27C:
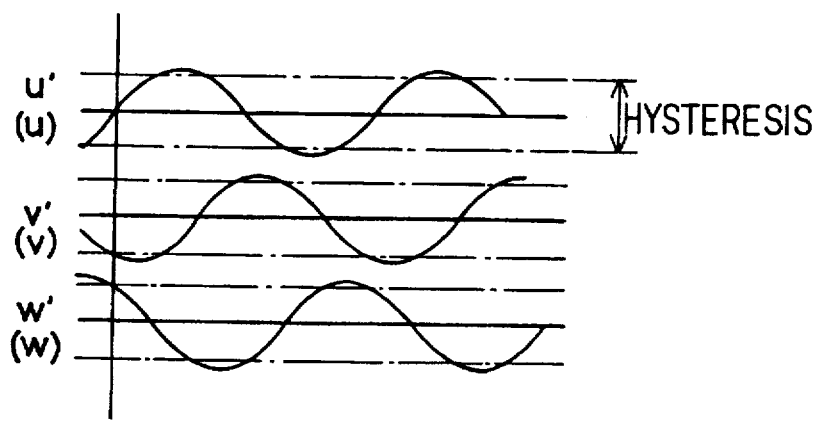

Since the magnetic sensors 6 through 8 are disposed at positions which are 90° electric angle behind the positions of the phase-windings 4a, 4b and 4c respectively, the sensor-output-signals u, v and w are generated in the same phase as the induced-phase-voltages $E_U$, $E_V$ and $E_W$ respectively as shown in FIG. 27C. Because, the magnetic-sensors 6 through 8 detect the magnetic flux φ itself, which leads 90° ahead of the induced phase voltage E=−dφ/dt.

The sensor-output-signals u, v and w are amplified by the amplifying-circuit 9 and taken into the phase-control-circuit 10.

Figure 28A:
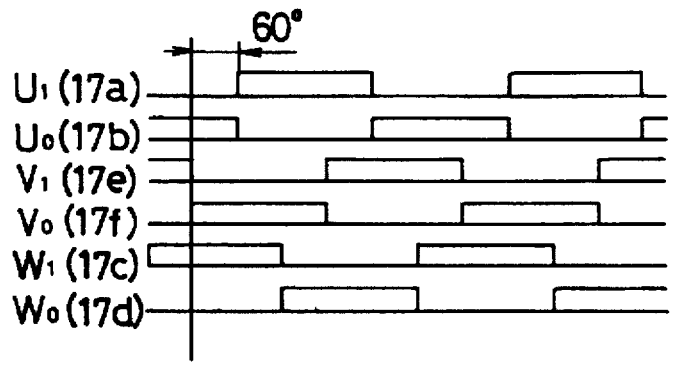
FIG. 28A, FIG. 28B and FIG. 28C are graphs showing wave-forms of transistor-input-signals, applied-line-voltages and applied-phase-voltages in the fourth embodiment.
Figure 28B:
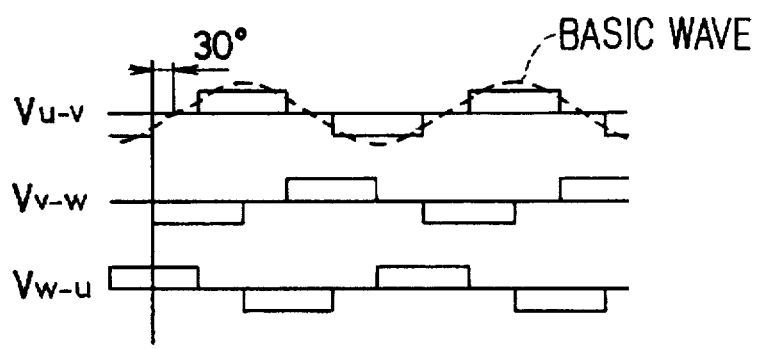

In the phase-control-circuit 10, the digital signals $U_0$, $U_1$, $V_0$, $V_1$, $W_0$ and $W_1$ shown in FIG. 28A are generated. These digital signals lag behind the sensor-output-signals u, v and w (the output signals of the amplifying-circuit 9) respectively by an angle corresponding to the hysteresis-amplitude which are stored in the map-circuit 22. The digital signals of this embodiment lag behind the sensor output signals by an electric angle 60°. The transistors 17a through 17f of the voltage-applying-circuit are driven by the digital signals $U_0$, $U_1$, $V_0$, $V_1$, $W_0$ and $W_1$, so that the AC-voltages $V_{U-V}$, $V_{V-W}$ and $V_{W-U}$ shown in FIG. 28B are applied across couples of the adjacent phase-windings 4a and 4b, phase-windings 4b and 4c and windings 4c and 4a respectively.

Figure 28C:
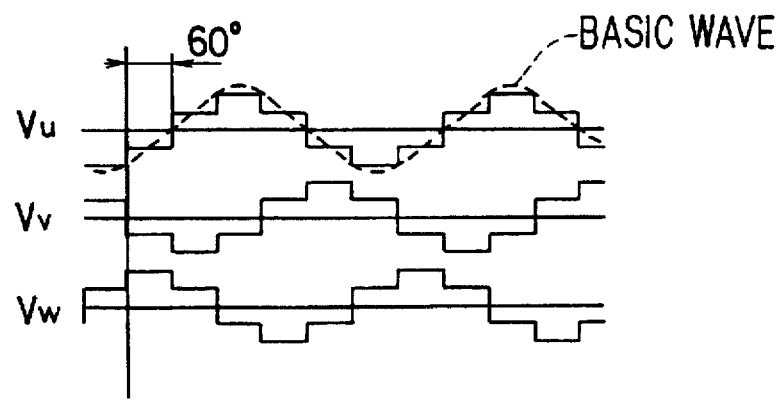
Figure 29:
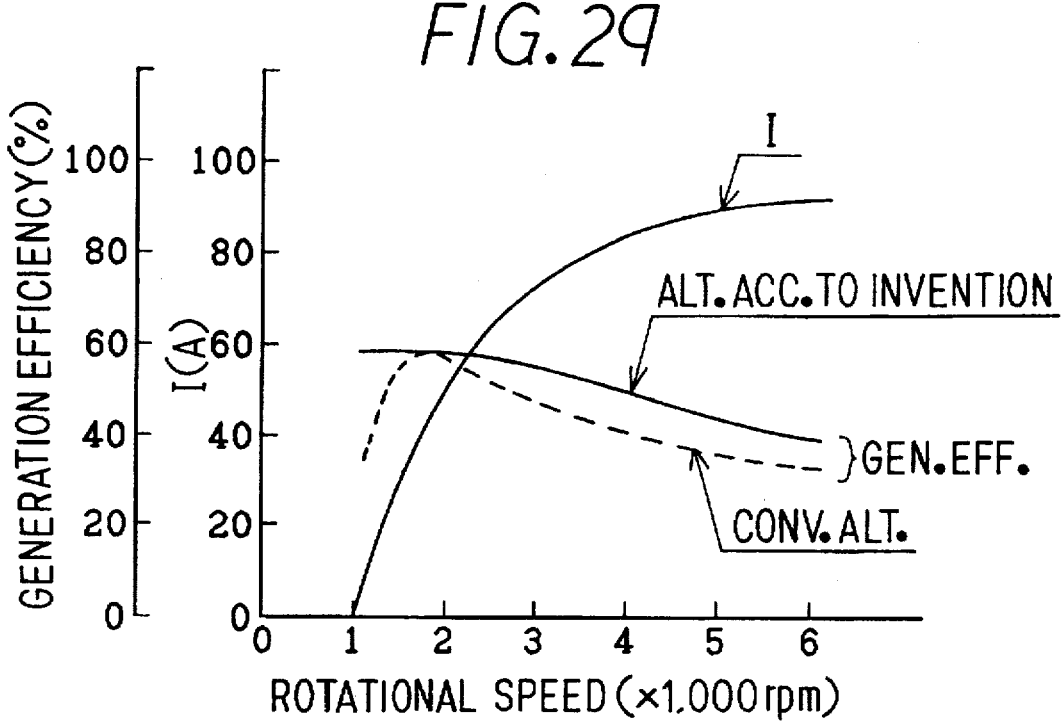
FIG. 29 is a graph showing the generation efficiency of the system according to the fourth embodiment.
Figure 32:
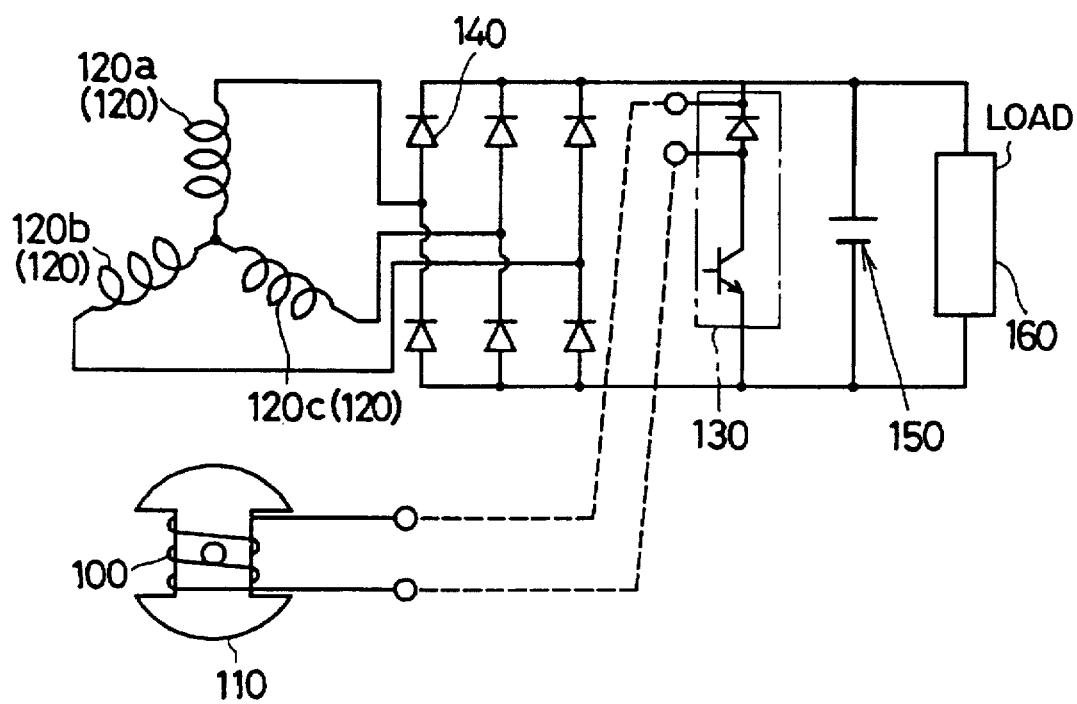
FIG. 32 is a circuit diagram of a conventional alternator for a vehicle.

Since the applied line-voltages $V_{U-V}$, $V_{V-W}$ and $V_{W-U}$ (or applied-AC-voltages) lag behind the induced-phase-voltages $E_U$, $E_V$ and $E_W$ by an electric angle 30° respectively, they lag behind the induced-line-voltages $E_{U-V}$, $E_{V-W}$ and $E_{W-U}$ shown in FIG. 27B by an electric angle 60° respectively. At the same time, the applied-phase-voltages $V_U$, $V_V$ and $V_W$ are obtained from the applied-line-Voltages $V_{U-V}$, $V_{V-W}$ and $V_{W-U}$. They lag behind the induced-phase-voltages $E_U$, $E_V$ and $E_W$ shown in FIG. 27B by an electric angle $_{60}$° respectively as shown in FIG. 28C. That is, the load angle ( or lag angle) δ between the applied-phase-voltages $V_U$, $V_V$ and $V_W$ and the induced-phase-voltages $E_U$, $E_V$ and $E_W$ can be set to 60° according to the hysteresis-amplitude stored in the map-circuit 22.

The efficiency control of the generation by the map-circuit 22 is described next.

At the beginning, the load angle δ is set to 60° according to the hysteresis-amplitude of the map-circuit 22, and the transistor 12 of the field-exciting-circuit is duty-controlled to supply a suitable amount of the field current $I_f$ so that the battery voltage becomes a target voltage (e.g. 14 V).

The map-circuit 22 detects the DC-current by the current sensor 20. The detected DC-current is multiplied by a target voltage (e.g. 14 V) of the control-circuit 11 to provide a required power P. Subsequently, a hysteresis-amplitude which corresponds to the load angle δ for a minimum loss $(P_c+P_f)$ or a maximum efficiency at the required power P and the electric-angular-velocity ω is selected from the control map. Then, the selected hysteresis-amplitude is applied to the phase-control-circuit 10.

As a result, the alternator generates the output power at its maximum efficiency in its entire rotational speed range, thereby realizing more fuel-saving of vehicles.

A fifth embodiment of the present invention is described next.

Figure 30:
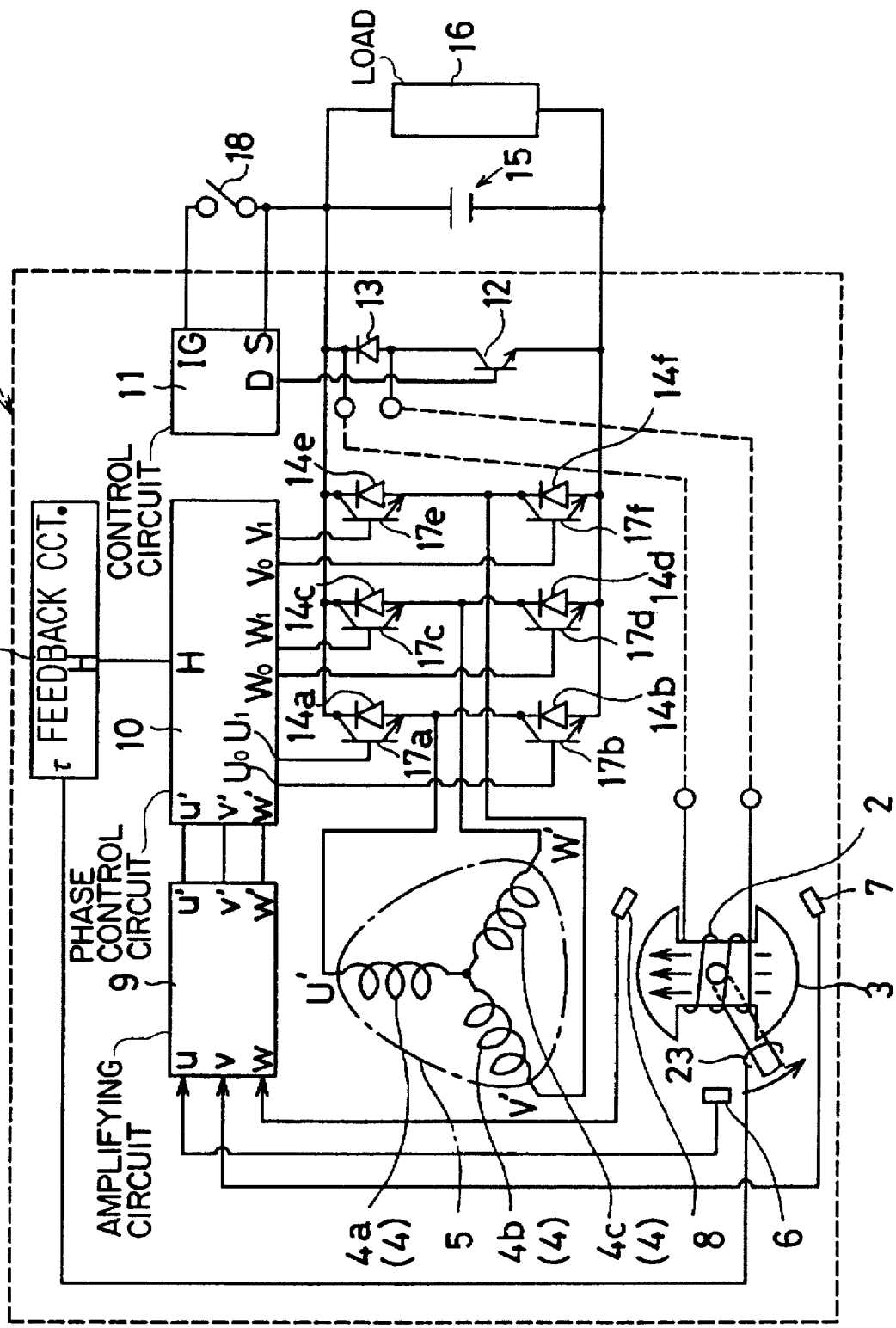
FIG. 30 is an overall circuit diagram of an alternator according to a fifth embodiment of the present invention.

FIG. 30 is an overall diagram of an alternator 1 for a vehicle according to the fifth embodiment. The alternator 1 is equipped with a torque-sensor 23 and a feedback-circuit 24 which controls the phase-control-circuit 10 according to an output signal of the torque-sensor 23.

In this embodiment, the load angle δ is set according to a hysteresis-amplitude applied by the feedback-circuit 24. The operation is the same as that of the fourth embodiment except for the operation of the feedback-circuit 24.

Figure 31:
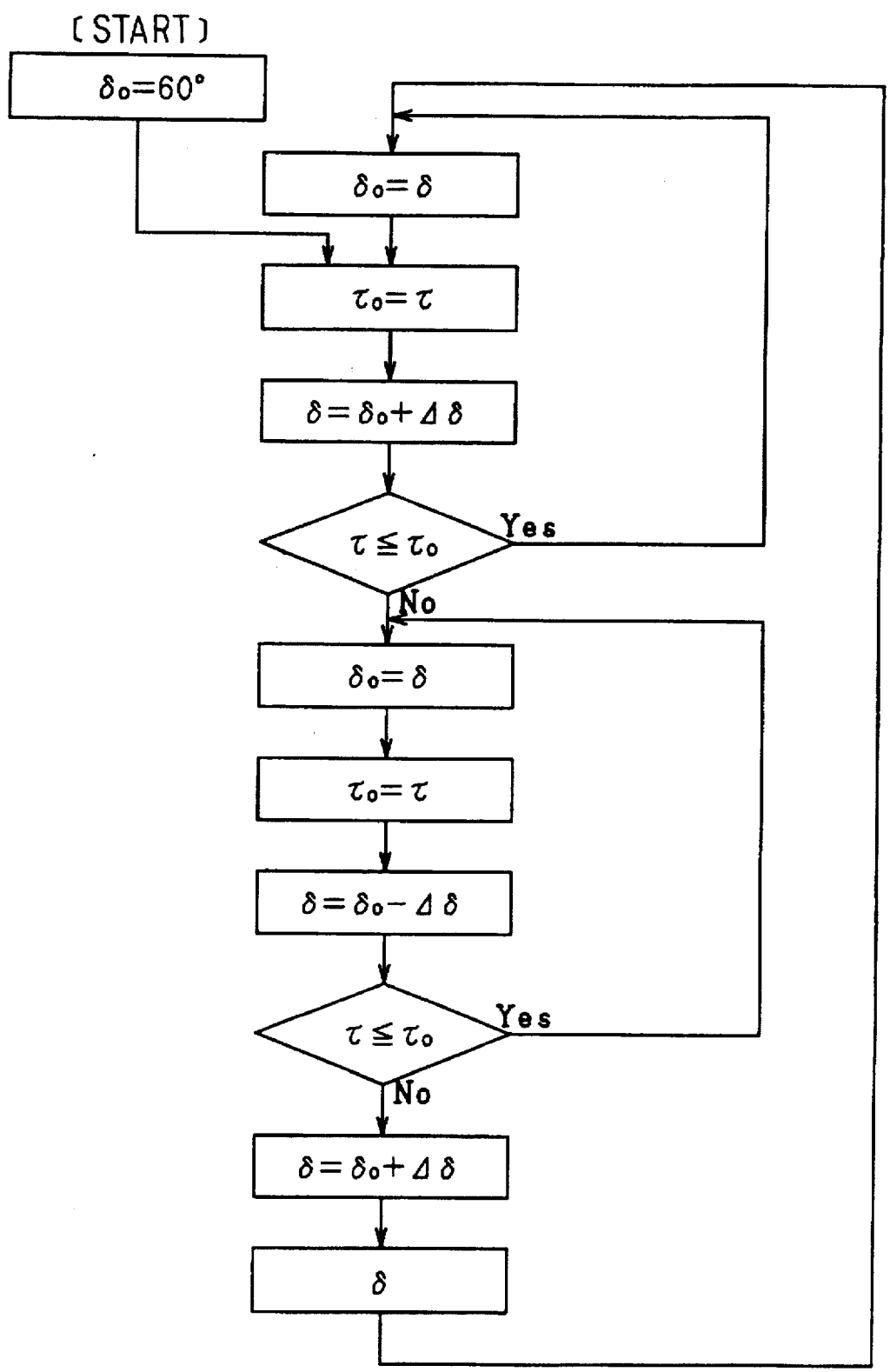
FIG. 31 is a chart of an algorithm for the operation of a feedback circuit of the fifth embodiment.
Figure 33:
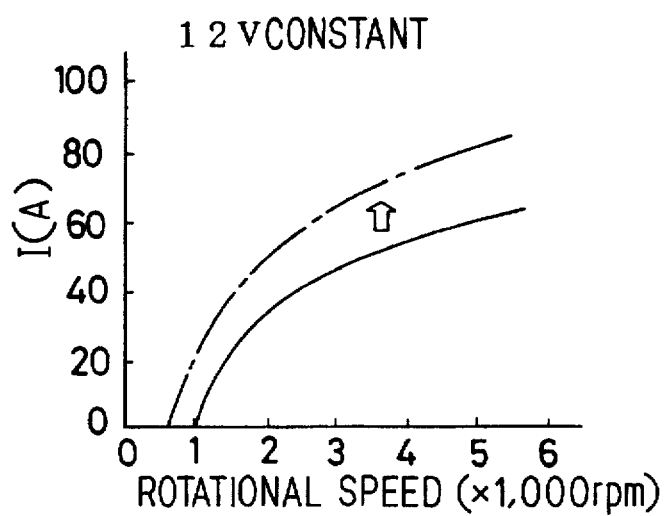
FIG. 33 is a graph showing an increase of generated power in the conventional alternator.
Figure 34:
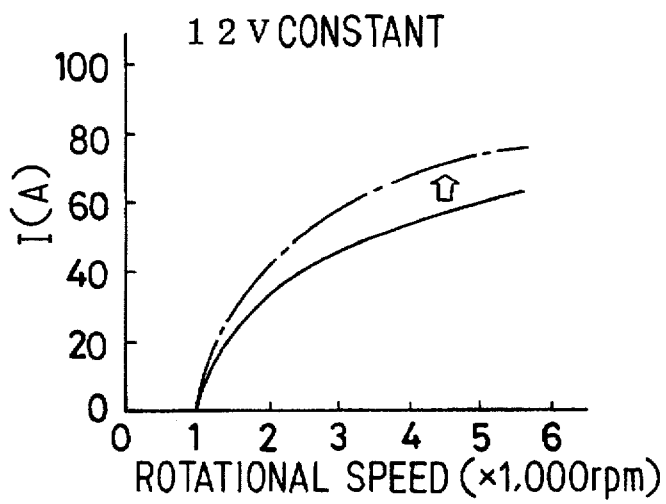
FIG. 34 is a graph showing an increase of generated power in the conventional alternator.
Figure 35:
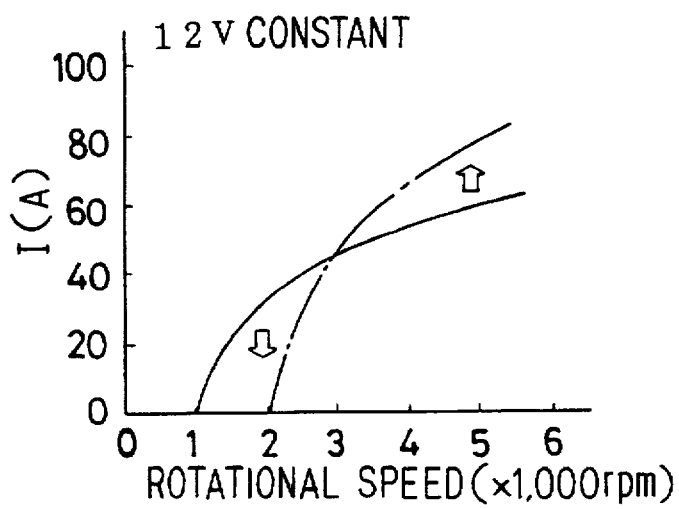
FIG. 35 is a graph showing an increase of generated power in the conventional alternator.

Therefore, only the operation of the feedback-circuit 24 is described with reference to an algorithm chart shown in FIG. 31.

Now, the load angle $δ_0$ is set to 60° according to the hysteresis-amplitude of the feedback-circuit 24, and the transistor 12 of the field-exciting-circuit is duty-controlled to supply a suitable current $I_f$ to the field coil 2 so that the battery voltage become a target voltage (e.g. 14 V).

The feedback-circuit 24 calculates a load angle δ from the shaft-torque τ of the rotor 3 which is detected by the torque-sensor 23 to obtain such a load angle δ as the shaft-torque τ become minimum (minimum loss and maximum efficiency) and applies a hysteresis-amplitude corresponding to the calculated load angle δ to the phase-control-circuit 10.

As a result, the alternator generates the output power at its maximum efficiency in its entire rotational speed range, thereby realizing more fuel-saying of vehicles.

An alternator according to a sixth embodiment of the present invention is described with reference to FIG. 40. The sixth embodiment has a current sensor 25 which detects currents of the three-phase-windings 4a, 4b and 4c and obtains respective phase angles of the induced-phase-voltages from the detected currents. Thus, the power sensor used in the alternator according to the first embodiment is omitted.

The alternator according to the sixth embodiment uses MOS-FETs 27a, 27b, 27c, 27d, 27e, and 27f as the switching elements. In this embodiment, since the diodes 26a, 26b, 26c, 26d, 26e and 26f are formed integrally with the MOS-FETs, they function in the same manner as the switching elements of the first embodiment.

As a variation, transistors 17a, 17b, 17c, 17d, 17e and 17f which are used as the switching elements of the voltage-applying-circuit in the previous embodiments may be replaced by thyristors.

The diodes 14a, 14b, 14c, 14d, 14e and 14f of the full-wave-rectifying-circuit and the transistor 17a, 17b, 17c, 17d, 17e and 17f of the voltage-applying-circuit may be integrated into a single chip such as a IGBT (insulated-gate bipolar transistor) or MOS-FET.

Although the three-phase windings 4a through 4c are Y-connected (in the first and third embodiments) or Δ-connected (in the second embodiment) of the armature coil 4, the number of phases or types of the winding connections are not limited to the embodiments described above.

The magnetic-sensors 6, 7 and 8 which are composed of Hall elements may be replaced by photo-sensors or by rotation sensors such as encoders or resolvers.

The amplifying-circuit 9 and the hysteresis circuit 10a, 10b and 10c used in the previous embodiments as the signal-processing-circuit may be replaced by a Hall-IC-chip on which those circuits are integrally formed.

Although the electric-angular-velocity ω is calculated by the F/V-convertor 21 according to the output u of the magnetic-sensor 6 in the fourth embodiment, it may be calculated according to the output v of the magnetic-sensor 7 or the output w of the magnetic-sensor 8.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. An AC generator for supplying electric power to a load comprising:

a magnetic field member having a field coil for generating magnetic flux responsive to an electric field current supplied to said field coil;

an armature member having an armature coil including multi-phase windings for generating an induced phase voltage in each of said phase-windings and providing a line voltage between each pair of said multi-phase windings responsive to said armature member being rotated relative to said magnetic field member;

a bridge-type full-wave rectifying circuit connected to said multi-phase windings for supplying an output-DC-voltage to said load;

a switching circuit also connected to said multi-phase windings and outputting a control-AC-voltage, which is provided to said armature coil; and a driving circuit connected to said switching circuit, said driving circuit causing said control-AC-voltage output by said switching circuit to lag a first prescribed electric angle behind a corresponding one of said induced-phase voltages and a current flowing through said corresponding one of said phase-windings to lead said corresponding one of said line-voltages by a second prescribed electric angle.

2. An AC generator according to claim 1 further comprising:

a field current control unit controlling said field current according to said output voltage of said full-wave rectifying circuit;

a power sensor for detecting an output power of said AC generator;

a rotational speed sensor detecting a rotational speed of said AC generator; and a map circuit connected to said power sensor and said rotational speed sensor, said map circuit including a control map storing electric angles which give minimum losses at respective combinations of said field current and said phase voltages, said map circuit selecting said first prescribed electric angle from said control map according to signals from said power sensor and said rotational speed sensor.

3. An AC generator according to claim 1 further comprising:

field current control unit controlling said field current according to said output voltage of said full-wave rectifying circuit;

a torque sensor for detecting power generating torque produced by said AC generator; and a feedback circuit, connected to said torque sensor, for setting said first prescribed lag angle according to a signal from said torque sensor.

4. An AC generator according to claim 1, said first prescribed electric angle behind a corresponding one of said induced voltages is between 30°–120°.

5. An AC generator according to claim 1, wherein said driving circuit is adapted to drive said switching circuit such that said control-AC-voltage approximates a sinusoidal voltage which varies in a stepwise manner.

6. An AC generator according to claim 1, wherein said driving circuit comprises a PWM-circuit for forming said control-AC-voltage.

7. An AC generator according to claim 1, wherein said full-wave rectifying bridge circuit comprises a plurality of diodes and said switching circuit comprises a plurality of switching elements, each diode being connected to one of said switching elements so that a conducting direction of said diode is opposite to that of said switching element.

8. An AC generator according to claim 7, wherein said diodes and said switching elements are disposed integrally in a unit.

9. An AC generator claimed in claim 7, wherein said switching elements comprise a plurality of insulated gate bipolar junction transistors.

10. An AC generator claimed in claim 7, wherein said switching elements comprise MOSFETs.

11. An AC generator claimed in claim 1, further comprising a position sensor positioned so as to detect a rotational position of said field member, wherein said driving circuit drives said switching circuit according to an output signal of said position sensor.

12. An AC generator claimed in claim 1, further comprising a phase-current sensor positioned so as to detect phase-currents of said phase-windings, wherein said driving circuit drives said switching circuit according to an output signal of said phase-current sensor.

13. An AC generator claimed in claim 1, wherein said multi-phase windings are configured in a Y-connection.

14. An AC generator claimed in claim 1, wherein said multi-phase windings are configured in a Δ-connection.

15. An AC generator for supplying an electric power to a load comprising:

a field coil for generating magnetic flux;

an armature coil including multi-phase windings for generating induced phase voltages and providing output-terminal-voltages responsive to said magnetic flux changing;

a bridge-type full-wave rectifying circuit having diodes connected to said multi-phase-windings for supplying a DC-voltage to said load;

voltage supplying circuit having switch elements connected respectively with said multi-phase-windings in parallel with said diodes, for supplying control voltages to said multi-phase windings respectively through said switch elements;

a position sensor for detecting a phase difference between said magnetic-flux and said phase voltage; and a driving circuit connected to said voltage supplying circuit and said position sensor, for controlling said switch elements according to said detected phase difference to provide said control voltages which lag a prescribed electric angle behind said induced phase voltages, thereby increasing said electric power provided to said load.

16. An AC generator according to claim 15 further comprising:

field current control unit controlling said field current according to said output voltage of said full-wave rectifying circuit;

a power sensor detecting an output power of said AC generator;

a rotational speed sensor detecting a rotational speed of said AC generator; and a map circuit including a control map storing lag angles which give maximum power at respective amounts of said field current and said phase voltage, said map circuit selecting said prescribed electric angle from said control map according to signals from said power sensor and said rotational speed sensor.

17. An AC generator according to claim 15 further comprising:

field current control unit controlling said field current according to said output voltage of said full-wave rectifying circuit;

a torque sensor for detecting power generating torque produced by said AC generator; and a control unit setting said prescribed electric-angle according to a signal from said torque sensor.

18. An AC generator according to claim 15, wherein said prescribed electric angle behind a corresponding one of said induced voltages is between 30°–120°.

19. An AC generator claimed in claim 15, wherein said voltage supplying circuit further comprises means for generating an approximated sinusoidal AC voltage.

20. An AC generator claimed in claim 19, wherein said means for generating an approximated sinusoidal-AC-voltage comprises a PWM circuit generating a group of rectangular pluses.

21. An AC generator claimed in claim 15, wherein said multi-phase windings are configured in a Δ-connection.

22. An AC generator claimed in claim 15, wherein said multi-phase windings are configured in a Y-connection.

23. An AC generator for supplying an electric power to a load including a battery comprising:

a magnetic field member having a field coil for generating magnetic flux responsive to an electric field current being supplied to said field coil;

an armature member having multi-phase-windings for generating an induced-phase-voltage in each of said phase-windings and providing line-voltage between each two of said multi-phase windings responsive to said armature member being rotated relative to said field member;

first means for supplying an output-DC-voltage to said load and for supplying a control-AC-voltage to said multi-phase windings, said first means having controllable switch elements connected in a full-wave rectifying bridge-circuit configuration between said multi-phase windings and said load; and second means, connected to said first means, for driving said controllable switch elements so that said control-AC-voltage lags at a first prescribed electric angle behind a corresponding one of said induced phase voltages and so that a current flowing through said corresponding one of said phase windings leads said corresponding one of said line-voltages by a second prescribed electric angle.

24. An AC generator according to claim 23, further comprising:

field current control means for controlling said field current according to said output voltage of said full-wave rectifying circuit;

a power sensor for detecting an output power of said AC generator;

a rotational speed sensor detecting a rotational speed of said AC generator; and a map circuit connected to said power sensor and said rotational speed sensor, said map circuit including a control map storing electric angles which give minimum losses at respective combinations of said field current and said phase voltages, said map circuit selecting a suitable electric angle from said control map according to signals from said power sensor and said rotational speed sensor.

25. An AC generator according to claim 23, further comprising:

field current control means for controlling said field current according to said output voltage of said full-wave rectifying circuit;

a torque sensor for detecting power generating torque produced by said AC generator; and a feedback circuit, connected to said torque sensor, for setting a suitable lag-angle according to a signal from said torque sensor.

26. An AC generator according to claim 23, said first prescribed electric angle behind a corresponding one of said induced voltages is between 30°–120°.

27. An AC generator according to claims 23, wherein said second means drives said switch elements so that said control-AC-voltage approximates a sinusoidal which varies in a stepwise manner.

28. An AC generator according to claim 23, wherein said second means comprises a PWM-circuit for forming said control-AC -voltage.

29. An AC generator according to claim 23, wherein said full-wave rectifying bridge circuit comprises a plurality of diodes each of which is connected to one of said controllable switch elements so that a conducting direction of said diode is opposite to that of an associated switch element.

30. An AC generator according to claim 29, wherein said diodes and said controllable switch elements are disposed integrally in a unit.

31. An AC generator claimed in claim 29, wherein said controllable switch elements comprise a plurality of insulated gate bipolar junction transistors.

32. An AC generator claimed in claim 30, wherein said controllable switch elements comprise MOSFETs.

33. An AC generator claimed in claim 23, further comprising a position sensor, connected to said second means, for detecting a rotational position of said field member, wherein said second means drives said switch according to an output signal of said position sensor.

34. An AC generator claimed in claim 23, further comprising a phase-current-sensor, connected to said second means, for detecting phase-currents of said phase-windings, wherein said second means drives said switch according to an output signal of said phase-current sensor.

35. An AC generator claimed in claim 23, wherein said multi-phase windings are configured in a Y-connection.

36. An AC generator claimed in claim 23, wherein said multi-phase windings are configured in a Δ-connection.

37. An AC generator for supplying an electric power to a load comprising:

a field coil for generating magnetic flux;

an armature coil including multi-phase windings for generating induced-phase-voltages and providing output-terminal voltages responsive to said magnetic flux changing;

a bridge-type full-wave rectifying circuit having diodes connected to said multi-phase windings for supplying a DC voltage to said load;

voltage supplying means, having switch elements connected respectively with said multi-phase windings in parallel with said diodes, for supplying control voltages to said multi-phase-windings respectively through said switch elements;

a position sensor for detecting phase difference between said magnetic-flux and said phase voltage; and a driving circuit connected to said voltage supplying means and said position sensor, for controlling said switch elements according to said detected phase difference to provide said control voltages which lag a suitable electric angle behind said induced phase voltages, thereby increasing said power output to said load.

38. An AC generator according to claim 37, further comprising:

field current control means for controlling said field current according to said output voltage of said full-wave rectifying circuit;

a power sensor for detecting an output power of said AC generator;

a rotational speed sensor detecting a rotational speed of said AC generator; and a map circuit including a control map storing lag angles which give maximum power at respective amounts of said field current and said phase voltage, said map circuit selecting said suitable electric angle from said control map according to signals from said power sensor and said rotational speed sensor.

39. An AC generator according to claim 37, further comprising:

field current control means for controlling said field current according to said output voltage of said full-wave rectifying circuit;

a torque sensor for detecting a power generating torque produced by said AC generator; and means for setting said suitable electric-angle according to a signal from said torque sensor.

40. An AC generator according to claim 37, wherein said first prescribed electric angle behind a corresponding one of said induced voltages is between 30°–120°.

41. An AC generator claimed in claim 37, wherein said voltage supplying means comprises means for generating an approximated sinusoidal AC voltage.

42. An AC generator claimed in claim 41, wherein said means for generating an approximated sinusoidal AC voltage comprises a PWM circuit for generating a group of rectangular pluses.

43. An AC generator claimed in claim 37, wherein said multi-phase windings are configured in a Y-connection.

44. An AC generator claimed in claim 37, wherein said multi-phase windings are configured in a Δ-connection.

* * * * *